US007218775B2

(12) United States Patent
Kokko et al.

(10) Patent No.: US 7,218,775 B2
(45) Date of Patent: May 15, 2007

(54) METHOD AND APPARATUS FOR IDENTIFYING AND QUANTIFYING CHARACTERISTICS OF SEEDS AND OTHER SMALL OBJECTS

(75) Inventors: Eric Gerard Kokko, Lethbridge (CA); Bernard Dale Hill, Lethbridge (CA)

(73) Assignee: Her Majesty the Queen in Right of Canada, as represented by the Minister of Agriculture and Agrifood, Lethbridge (CA)

( * ) Notice: Subject to any disclaimer, the term of this patent is extended or adjusted under 35 U.S.C. 154(b) by 769 days.

(21) Appl. No.: 10/245,862

(22) Filed: Sep. 16, 2002

(65) Prior Publication Data

US 2003/0072484 A1    Apr. 17, 2003

Related U.S. Application Data

(60) Provisional application No. 60/338,018, filed on Nov. 2, 2001, provisional application No. 60/323,044, filed on Sep. 17, 2001.

(51) Int. Cl.
*G06K 9/00* (2006.01)

(52) U.S. Cl. .................................. 382/156; 382/155
(58) Field of Classification Search .............. 382/155, 382/157
See application file for complete search history.

(56) References Cited

U.S. PATENT DOCUMENTS

| | | | |
|---|---|---|---|
| 4,227,211 A | 10/1980 | Disbrow | 358/113 |
| 4,260,262 A | 4/1981 | Webster | 356/418 |
| 4,624,367 A | 11/1986 | Shafer et al. | 209/577 |

(Continued)

FOREIGN PATENT DOCUMENTS

DE    196 10 849 C1    10/1997

(Continued)

OTHER PUBLICATIONS

Boser, B.E., Guyon, I.M. and Vapnik, V.N. (1992) A training algorithm for optimal margin classifiers. Proceedings of the Annual ACM Workshop on Computational Learning Theory, New York, NY, pp. 144-152.

(Continued)

*Primary Examiner*—Joseph Mancuso
*Assistant Examiner*—Alex Liew
(74) *Attorney, Agent, or Firm*—Greenlee Winner and Sullivan PC

(57) ABSTRACT

The invention provides a method for identifying or quantifying characteristics of interest of unknown objects, comprising training a single neural network model with training sets of known objects having known values for the characteristics; validating the optimal neural network model; and analyzing unknown objects having unknown values of the characteristics by imaging them to obtain a digital image comprising pixels representing the unknown objects, background and any debris; processing the image to identify, separate, and retain pixels representing the unknown objects from pixels and to eliminate background and debris; analyzing the pixels representing each of the unknown objects to generate data representative of image parameters; providing the data to the flash code deployed from the candidate neural network model; analyzing the data through the flash code; and receiving output data (the unknown values of the characteristics of interest of the unknown objects) from the flash code in a predetermined format.

71 Claims, 2 Drawing Sheets

U.S. PATENT DOCUMENTS

| | | | | |
|---|---|---|---|---|
| 4,741,042 A | * | 4/1988 | Throop et al. | 382/110 |
| 4,887,155 A | | 12/1989 | Massen | 358/107 |
| 4,946,046 A | | 8/1990 | Affleck et al. | 209/580 |
| 4,963,035 A | | 10/1990 | McCarthy et al. | 382/28 |
| 4,975,863 A | | 12/1990 | Sistler et al. | 364/555 |
| 5,132,538 A | | 7/1992 | Norris | 250/339 |
| 5,253,302 A | | 10/1993 | Massen | 382/1 |
| 5,253,765 A | | 10/1993 | Moorehead et al. | 209/539 |
| 5,257,182 A | * | 10/1993 | Luck et al. | 382/224 |
| 5,321,491 A | | 6/1994 | Summers et al. | 356/53 |
| 5,321,764 A | | 6/1994 | Cullen et al. | 382/1 |
| 5,392,359 A | | 2/1995 | Futamura et al. | 382/8 |
| 5,526,437 A | | 6/1996 | West | 382/141 |
| 5,655,028 A | | 8/1997 | Soll et al. | 382/133 |
| 5,661,820 A | * | 8/1997 | Kegelmeyer, Jr. | 382/226 |
| 5,732,147 A | | 3/1998 | Tao | 382/110 |
| 5,761,070 A | | 6/1998 | Conners et al. | 364/478 |
| 5,764,792 A | | 6/1998 | Kennealy | 382/133 |
| 5,764,819 A | | 6/1998 | Orr et al. | 382/110 |
| 5,841,883 A | | 11/1998 | Kono et al. | 382/110 |
| 5,845,002 A | | 12/1998 | Heck et al. | 382/110 |
| 5,850,470 A | * | 12/1998 | Kung et al. | 382/157 |
| 5,864,984 A | | 2/1999 | McNertney | 47/1.01 |
| 5,898,792 A | | 4/1999 | Öste et al. | 382/110 |
| 5,917,927 A | | 6/1999 | Satake et al. | 382/110 |
| 5,933,524 A | * | 8/1999 | Schuster et al. | 382/168 |
| 5,956,413 A | | 9/1999 | Öste et al. | 382/110 |
| 6,005,959 A | | 12/1999 | Mohan et al. | 382/110 |
| 6,009,186 A | | 12/1999 | Goretta et al. | 382/110 |
| 6,014,451 A | | 1/2000 | Berry et al. | 382/110 |
| 6,236,739 B1 | | 5/2001 | Conrad | 382/110 |
| 6,324,531 B1 | | 11/2001 | Anderson et al. | 706/15 |
| 6,410,872 B2 | | 6/2002 | Campbell et al. | 209/577 |
| 6,427,128 B1 | | 7/2002 | Satake et al. | 702/81 |
| 6,771,836 B2 | * | 8/2004 | Lawton | 382/260 |
| 6,819,790 B2 | * | 11/2004 | Suzuki et al. | 382/156 |
| 6,937,744 B1 | * | 8/2005 | Toyama | 382/103 |

FOREIGN PATENT DOCUMENTS

| | | |
|---|---|---|
| DE | 198 01 400 A1 | 7/1999 |
| EP | 0226430 A3 | 9/1986 |
| WO | WO 01/69403 A1 | 3/2001 |

OTHER PUBLICATIONS

ImageProPlus Online, Jul. 10, 2001, Mediacybernetics XP-002236715.

Lawson, D., Hale, R. and Williams, B. (1987) Brain stetson: a tool for the design and test of neural network simulations. Proceedings of the Southeast Conference, Tampa, FL, pp. 530-534.

Lee, J.S., Hwang, J., Davis, D.T. and Nelson, A.C. (1991) Integration of neural networks and decision tree classifiers for automated cytology screening. Proceedings of the International Joint Conference on Neural Networks, vol. 1, Seattle, WA, pp. 257-262.

NeuralWare.Com "NeuralWare Products, NeuralWorks Predict" Jul. 19, 2001 (website—www.neuralware.com).

Refenes, A.N., Jain, N. and Alsulaiman, M.M. (1990) An integrated neural network system for histological image understanding. Proceedings of the SPIE, vol. 1386, Machine Vision Systems Integration in Industry, pp. 62-74.

Revenu, M., Elmoataz, A., Porquet, C. and Cardot, H. (1993) An automatic system for the classification of cellular categories in cytological images. Proceedings of the SPIE, vol. 2055, Intelligent Robots and Computer Vision XII, pp. 32-43.

* cited by examiner

METHOD AND APPARATUS FOR IDENTIFYING AND QUANTIFYING CHARACTERISTICS OF SEEDS AND OTHER SMALL OBJECTS

CROSS REFERENCE TO RELATED APPLICATIONS

This application claims priority from U.S. Provisional Patent Application No. 60/338,018 filed Nov. 2, 2001 and U.S. Provisional Patent Application No. 60/323,044 filed Sep. 17, 2001. To the extent that they are consistent herewith, the aforementioned applications are incorporated herein by reference.

FIELD OF THE INVENTION

The invention pertains to a method and apparatus for identifying and quantifying one or more characteristics of interest of seeds or other objects.

BACKGROUND OF THE INVENTION

In the grain industry, the need to qualify, classify and grade seeds using an objective system has long been desired. Presently, these tasks are accomplished by manual, visual inspection and assessment. Inspection of seeds is a task which requires extensive specialized training of human resources. However, seeds may not be graded the same way visually by different individuals, and such visual tasks are time-consuming and tedious, leading to inaccuracies in inspection due to human fatigue. Inspection of seeds can involve assessment of more than one parameter, data which may be too excessive to be obtained efficiently by a human inspector. Since the current manual, visual inspection is labour intensive and highly prone to subjective human error and bias, there is thus a need for a system which accomplishes the qualifying, classification and grading of a sample of seeds objectively and efficiently.

Image analysis relates to a systematic operation or series of operations performed on data representative of an observed image with the aim of measuring a characteristic of the image, detecting variations and structure in the image, or transforming the image in a way that facilitates its interpretation. Computer based image analysis systems are commonly applied to animal, plant, food and hardware inspection. Such systems are able to transform an image to improve its visual quality prior to recognition, and measuring significant characteristics of the image which are representative of the scanned object of interest.

Image analysis systems of the prior art pertaining to grains or seeds appear not to examine the presence/absence of disease, focusing instead upon methods and devices to determine parameters such as size, shape, area, and broken/whole. For example, U.S. Pat. No. 5,917,927 to Satake et al. discloses an apparatus and method for inspection of rice and other grains to determine the content of broken rice grains.

Thus, a method and apparatus which permit an extensive variety of analyses related to classification, disease, environmental situations, and handling of seeds or grains would be advantageous. With respect to classification of seeds, both class and the specific variety within a class is important information. Such detail of classification appears not to be capably provided by the prior art, yet such level of detail is desirable in the grain industry.

Image analysis systems of the prior art suffer disadvantages associated with emphasizing alignment of grains on grooved trays or belts as an essential step. For example, the apparatus of U.S. Pat. No. 5,917,927 to Satake et al. requires alignment of grains side-by-side lengthwise in a grooved tray. The apparatus of U.S. Pat. No. 5,898,792 to Oste et al. includes a conveyor belt which transports kernels to a second belt where a scraper spreads them in one layer to be oriented longitudinally in grooves on the belt. In U.S. Pat. No. 4,975,863 to Sistler et al., the apparatus involves a vacuum source to position kernels for imaging. These alignment features limit the speed and sample sizes that can be accommodated by the prior art systems. A method and apparatus is needed with no necessity for orientation of seeds or other objects required.

SUMMARY OF THE INVENTION

The invention provides a method of image analysis, involving particular steps of color correction, edge determination, digital sieving, and analysis based on neural nets using data sets. To the inventor's knowledge, such steps of image analysis do not appear in the prior art.

Broadly, the invention pertains to a method for identifying or quantifying one or more characteristics of interest of unknown objects, comprising the steps of:

A training of a single neural network model with a first and a second training set of known objects having known values for the one or more characteristics of interest;

B validating the optimal neural network model; and

C analyzing unknown objects having unknown values of the one or more characteristics of interest, comprising the steps of:

I imaging the unknown objects having unknown values of the one or more characteristics of interest against a background to obtain an original digital image, wherein the original digital image comprises pixels representing the unknown objects, the background and any debris;

II processing the original digital image to identify, separate, and retain the pixels representing the unknown objects from the pixels representing the background and the pixels representing any debris, and to eliminate the background and any debris;

III analyzing the pixels representing each of the unknown objects to generate data representative of one or more image parameters for each of the unknown objects;

IV providing the data to a chosen flash code deployed from the candidate neural network model;

V analyzing the data through the flash code; and

VI receiving the output data from the flash code in a predetermined format, wherein the output data represents the unknown values of the one or more characteristics of interest of the unknown objects.

Preferably, the method for training of a single neural network model with a first and second training set of known objects having known values for the one or more characteristics of interest, comprises the steps of:

A I selecting known objects having known values for the one or more characteristics of interest;

II arranging the known objects into a spectrum according to increasing degree of expression of the one or more characteristics of interest;

III segregating the known objects into a first and a second training set corresponding to a predetermined state of the one or more characteristics of interest;

III imaging each of the first and second training sets against a background to obtain an original digital image for each of the training sets, wherein each of the original digital images comprises pixels representing the known objects, background and any debris;

IV processing the original digital image to identify, separate, and retain the pixels representing the known objects from the pixels representing the background and the pixels representing any debris, and to eliminate the background and any debris;

V analyzing the pixels representing each of the known objects to generate data representative of one or more image parameters for each of the known objects;

VI providing the data to the neural network software to generate multiple candidate neural network models, wherein the multiple candidate neural network models each can have a flash code for deployment; and VII choosing an optimal neural network model from the multiple candidate neural network models and retaining the corresponding flash code of the optimal neural network model for identifying or quantifying the one or more characteristics of interest of unknown objects having unknown values of the one or more characteristics of interest; and B validating the optimal neural network model comprising the steps of:

I selecting more than one sample of the known objects having known values for the one or more characteristics of interest;

II imaging each sample against a background to obtain an original digital image for each sample, wherein the original digital image comprises pixels representing the known objects, background and any debris;

III processing the original digital image to identify, separate, and retain the pixels representing the known objects from the pixels representing the background and the pixels representing any debris, and to eliminate the background and any debris;

IV analyzing the pixels representing each of the known objects to generate data representative of one or more image parameters for each of the known objects;

V providing the data to a chosen flash code deployed from the candidate neural network model;

VI analyzing the data through the flash code;

VII evaluating the output data from the flash code for accuracy and repeatability;

VIII choosing and deploying the flash code of the optimal neural network model for identifying or quantifying the one or more characteristics of interest of unknown objects having unknown values of the one or more characteristics of interest.

Preferably, the method of analyzing unknown objects having unknown values of the one or more characteristics of interest comprises the steps of:

I imaging the unknown objects having unknown values of the one or more characteristics of interest against a background to obtain an original digital image, wherein the original digital image comprises pixels representing the unknown objects, the background and any debris;

II processing the original digital image to identify, separate, and retain the pixels representing the unknown objects from the pixels representing the background and the pixels representing any debris, and to eliminate the background and any debris;

III analyzing the pixels representing each of the unknown objects to generate data representative of one or more image parameters for each of the unknown objects;

IV providing the data to the chosen flash code deployed from the candidate neural network model;

V analyzing the data through the flash code; and

VI receiving the output data from the flash code in a predetermined format, wherein the output data represents the unknown values of the one or more characteristics of interest of the unknown objects.

In another embodiment, the invention provides a method of processing a digital image to identify, separate, and retain pixels representing objects from pixels representing the background and pixels representing any debris, and to eliminate the background and any debris.

In another embodiment, the invention provides a method of processing a digital image comprising pixels representing objects to remove some debris and to separate each of the objects comprising the steps of:

i removing some debris from the original digital image of the objects by applying a first digital sieve, wherein the first digital sieve selects the pixels representing each of the objects meeting a predetermined threshold for a first set of one or more image parameters of the objects; and ii in the image from (i), separating each of the objects that are adjacent by applying an object-splitting algorithm at least once.

In another embodiment, the invention provides a method of processing a digital image comprising pixels representing objects to remove remaining debris or object anomalies comprising the step of: separating and removing pixels representing remaining debris or object anomalies from the pixels representing each of the objects by applying a second digital sieve, wherein the second digital sieve selects the pixels representing each of the objects meeting predetermined thresholds for a second set of one or more image parameters.

In another embodiment, the invention provides a method of analyzing pixels representing objects to generate data representative of one of more parameters for each of the objects wherein the one or more image parameters are dimension, shape, texture, and color.

In another embodiment, the invention provides a method for obtaining one or more image parameters of color for objects comprising the step of generating an outline of the pixels representing each of the objects.

In yet another embodiment, the invention provides a method for identifying or quantifying one or more characteristics of interest of unknown objects comprising the steps of:

A training of a single neural network model with a first and a second training set of known objects having known values for the one or more characteristics of interest, wherein training of the single neural network model comprises the steps of:

I selecting known objects having known values for the one or more characteristics of interest;

II arranging the known objects into a spectrum according to increasing degree of expression of the one or more characteristics of interest;

III segregating the known objects into a first and a second training set corresponding to a predetermined state of the one or more characteristics of interest;

IV imaging each of the first and second training sets against a background to obtain an original digital image for each of the training sets, wherein each of the original digital images comprises pixels representing the known objects, background and any debris;

V processing the original digital image to identify, separate, and retain the pixels representing the known objects from the pixels representing the background and the pixels representing any debris, and to eliminate the background and any debris;

VI analyzing the pixels representing each of the known objects to generate data representative of one or more image parameters for each of the known objects;

VII providing the data to the neural network software to generate multiple candidate neural network models, wherein the multiple candidate neural network models each can have a flash code for deployment; and VIII choosing an optimal neural network model from the multiple candidate neural network models and retaining the corresponding flash code of the optimal neural network model for identifying or quantifying the one or more characteristics of interest of unknown objects having unknown values of the one or more characteristics of interest; and B validating the optimal neural network model comprising the steps of:

I selecting more than one sample of the known objects having known values for the one or more characteristics of interest;

II imaging each sample against a background to obtain an original digital image for each sample, wherein the original digital image comprises pixels representing the known objects, background and any debris;

III processing the original digital image to identify, separate, and retain the pixels representing the known objects from the pixels representing the background and the pixels representing any debris, and to eliminate the background and any debris;

IV analyzing the pixels representing each of the known objects to generate data representative of one or more image parameters for each of the known objects;

V providing the data to the chosen flash code deployed from the candidate neural network model;

VI analyzing the data through the flash code;

VII evaluating the output data from the flash code for accuracy and repeatability;

VIII choosing and deploying the flash code of the optimal neural network model for identifying or quantifying the one or more characteristics of interest of unknown objects having unknown values of the one or more characteristics of interest; and C analyzing unknown objects having unknown values of the one or more characteristics of interest, comprising the steps of:

I imaging the unknown objects having unknown values of the one or more characteristics of interest against a background to obtain an original digital image, wherein the original digital image comprises pixels representing the unknown objects, the background and any debris;

II processing the original digital image to identify, separate, and retain the pixels representing the unknown objects from the pixels representing the background and the pixels representing any debris, and to eliminate the background and any debris;

III analyzing the pixels representing each of the unknown objects to generate data representative of one or more image parameters for each of the unknown objects;

IV providing the data to the flash code deployed from the candidate neural network model;

V analyzing the data through the flash code; and

VI receiving the output data from the flash code in a predetermined format, wherein the output data represents the unknown values of the one or more characteristics of interest of the unknown objects.

In a further embodiment, the invention provides a preferred apparatus to achieve such processing and analysis, comprising: an image capture device (e.g., scanner, camera); a seed or object presentation device (hardware presentation e.g., holder, tray, or belt); a monitor; and a computer having an executable seed or object analysis program which is written with programming software (e.g., Visual Basic™); image analysis software (e.g., ImageProPlus™); data processing software (e.g., Excel™); and neural network modelling software (e.g., Predict™). A printer can also be added to produce a hardcopy of the results.

As used herein and in the claims, the terms and phrases set out below have the meanings which follow. All spatial measurements are reported in the current spatial unit; all intensity measurements are reported in terms of the current intensity calibration.

"AOI" means the area of interest or designated area.

"Area" means the area of each object (minus any holes). The area comprised of pixels having intensity values within the selected range is reported unless a Fill Holes option has been enabled. If Fill Holes is enabled, all pixels within the object perimeter are included in the area measurement.

"Area/Box" means the ratio between the area of each object, and the area of its imaginary bounding box, as determined by Area of Object/Area of Box.

"Area (polygon)" means the area of the polygon that defines the object's outline.

"Aspect Ratio" uses the ratio between the area of each object, and the area of its imaginary bounding box, as determined by Area of Object/Area of Box. It means the ratio between the major axis and the minor axis of the ellipse equivalent to the object (i.e., an ellipse with the same area, first and second degree moments), as determined by Major Axis/Minor Axis.

"Axis (major)" means the line that passes through the longest length of an object in such a way that part of the object on one side of the line is a mirror reflection or image of the part of the figure on the other side of the line. It is the line that is the longest distance across an object through the center.

"Axis (minor)" means the line that passes through the shortest length of an object in such a way that part of the object on one side of the line is a mirror reflection or image of the part of the figure on the other side of the line. It is the line that is the shortest distance across an object through the center.

"Centroid X" means the X-coordinate position of the centroid of the object from the left side of the image.

"Centroid Y" means the Y coordinate position of the centroid pixel of the object from the top of the image.

"Center Mass-X" means the X-coordinate position of the centroid of the object based on intensity measurements.

"Center Mass-Y" means the Y coordinate position of the centroid pixel based on intensity measurements.

"Clumpiness" is meant to refer to the object's texture, and is derived from the Heterogeneity measurement.

"Count (adjusted)" means the size-weighted object count, and only works when a "clean border" flag is turned on. "Clean border" is a command to eliminate any objects which are touching the image border.

"Dendrite" means any set of pixels that is one pixel wide.

"Density Blue" means the mean blue value for the measured object in a true color image.

"Density Green" means the mean green value for the measured object in a true color image.

"Density Red" means the mean red value for the measured object in a true color image.

"Density (max)" means the maximum intensity or density inside the object.

"Density (mean)" means the average intensity or density of the sum of all pixels divided by the number of pixels inside the object.

"Density (min)" means the minimum intensity or density inside the object.

"Density (std dev.)" means the standard deviation of density or intensity inside the object.

"Diameter (avg)" means the average length of diameters measured at 5° intervals around the centroid of each object.

"Diameter (max)" means the length of the longest line joining two outline points and passing through the centroid.

"Diameter (min)" means the length of the shortest line that can be drawn to pass through the centroid position and join two points on each object's perimeter.

"Diameter (mean)" means the average length of the diameters measured at two degree intervals joining two outline points and passing through the centroid.

"Feret" means the tangent to tangent distance or the distance between the extreme parallel tangents of an object, such distance being measured at an angle to perpendicular to the tangents.

"Feret (max)" means the longest caliper (feret) length.

"Feret (min)" means the shortest caliper (feret) length.

"Feret (mean)" means the average caliper (feret) length.

"Fractal dimension" refers to the fractal dimension of the object's outline.

"Graphical user interface" or "GUI" refers to the interface between the operating system and the user whereby computer files or programs to be manipulated are represented pictorially as icons, allowing the user to issue commands.

"Heterogeneity" means the fraction of pixels that vary by more than a set percentage, preferably 10%, from the average intensity of the object. It also refers to the fractions of heterogeneous pixels remaining in an object after an erosion process.

"Hole" means any contiguous set of pixels within an object that have intensity values outside the selected range for objects. If the Fill Holes option is set, this value will be 0.

"Holes" means the number of holes inside an object.

"Hole Area" means the area of holes within an object.

"Hole Ratio" means the ratio of the object area excluding holes, to the total area of the object, as determined by Area/(Area+Holes Area). When a Hole measurement is selected, Area is the area of the object less the area of the holes. If the Fill Holes option is set, this value will be 1.

"Integrated Optical Density" or "IOD" means the average intensity/density of each object. This value is expressed in terms of the current intensity/density mode and calibration.

"Margination" means the distribution of intensity between centre and edge of object.

"Object" or "objects" is meant to refer to both seed and non-seed object applications. It should also be understood that the term "object" or "objects" is meant to refer to an entire object, or a portion of an object. The "object" or "objects" suitable for the invention are those which can be imaged to obtain an original digital image for processing and analyzing in accordance with the invention as described herein. The "object" or "objects" refer to seeds or non-seed and non-grain articles, including plants and plant parts, food articles, biological materials, and industrial articles. The plant or plant parts include, but are not limited to, leaves, stems, roots, plant organs, and seeds of, for example, wheat, rice, corn, soybeans, canola, barley, sorghum, millet, rye, oats, flax, buckwheat, alfalfa, mustard, clover, sunflower, field beans, field peas, forages, coffee, lentils, peanuts, beets, lettuce, and hemp seeds. Food articles include, but are not limited to, fruits and vegetables; for example, produce, apples, potatoes, sugar cane, tea, hemp seeds, cocoa beans, nuts, and sugar beets. Biological matter includes, but is not limited to, insects, microorganisms and cells (e.g., sperm cell morphology). Industrial articles include, but are not limited to, pharmaceuticals, pills, spray droplets, test plates, Petri dishes (colony counting, measuring), bio-tech arrays (including ELISA test plates), water, paper products, plastic pellets, paint, dry powders, wet products, textiles, raw food samples, processed food samples, package goods, parts, and general granular samples, and other non-seed commodities.

"Perimeter" means the length of the outline of each object. When holes are outlined, the perimeters of the holes are added to the perimeter of the object.

"Perimeter (convex)" means the perimeter of the convex outline of each object.

"Perimeter (ellipse)" refers to the perimeter of the ellipse surrounding the outline of each object.

"Perimeter (ratio)" means the ratio of the perimeter (convex) to the perimeter of each object.

"Radius (max)" means the maximum distance between each object's centroid pixel position and its perimeter.

"Radius (min)" means the minimum distance between each object's centroid pixel position and its perimeter.

"RadiusRatio" means the ratio between Max Radius and Min Radius for each object, as determined by Max Radius/Min Radius.

"Roundness" means the roundness of each object, as determined by the following formula: (perimeter×2)/(4×perimeter×area). Circular objects will have a roundness=1, while other shapes will have a roundness>1.

"Size (length)" means the feret diameter (caliper length) along a axis (major) of the object.

"Size (width)" means the feret diameter (caliper length) along a axis (minor) of the object.

DETAILED DESCRIPTION OF THE INVENTION

Figure 1:
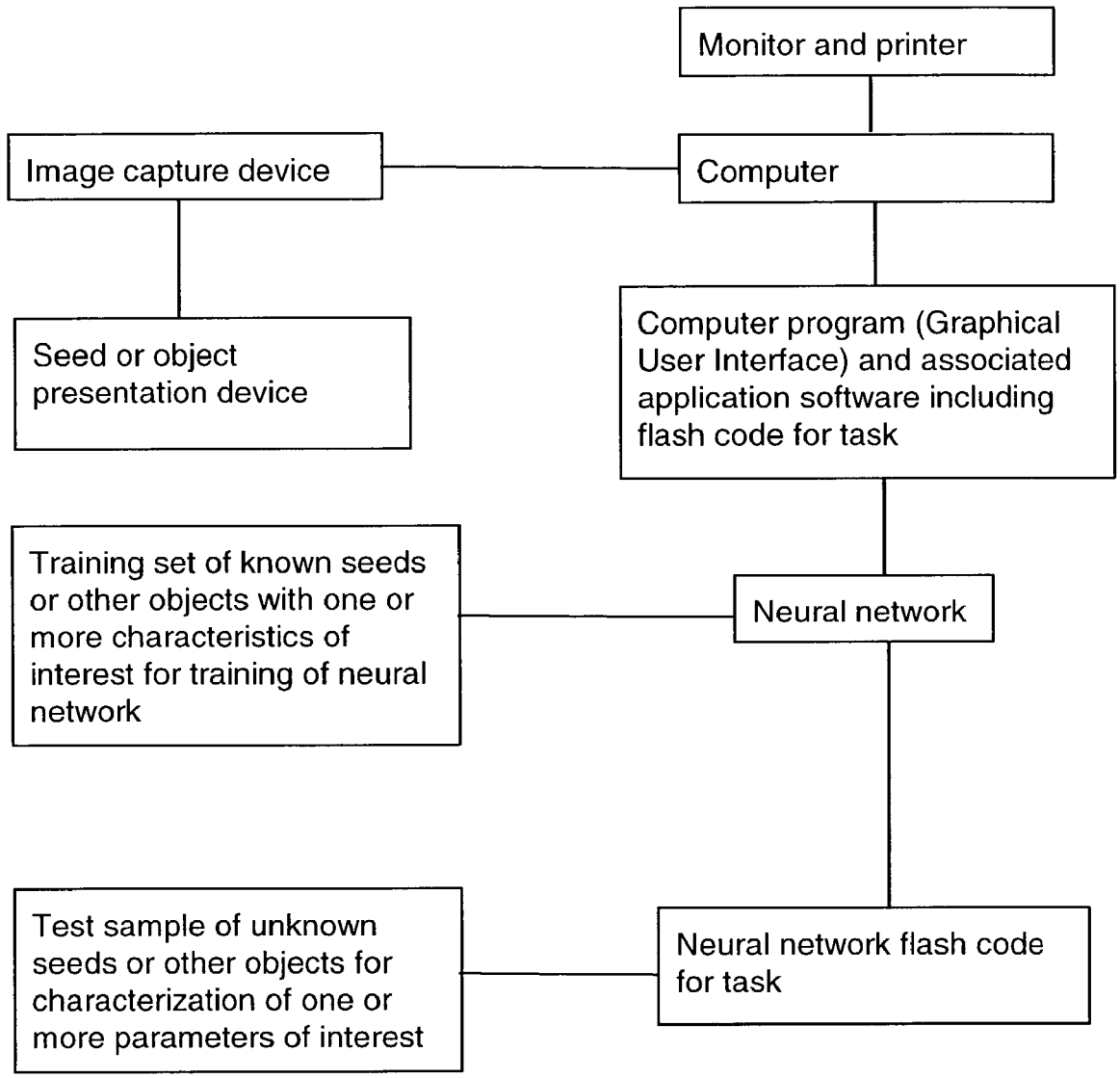
FIG. 1 is a flow diagram which illustrates an exemplary apparatus which can be used to conduct the processing and analytical steps of the invention as depicted in the following FIG. 2.

The invention pertains to a method and apparatus for identifying or quantifying one or more characteristics of interest of seeds or other objects. Although the invention is described herein for the characterization of seeds, it will be appreciated that the invention is equally useful for the characterization of other objects. It will be understood that the term "object" or "objects" as used herein and in the claims is meant to refer to both seed and non-seed object applications, or as listed in the claims. It should also be understood that the term "object" or "objects" is meant to refer to an entire object, or a portion of an object. The "object" or "objects" suitable for use with the invention refer to those which can be imaged to provide an original digital image for processing and analyzing in accordance with the invention as described herein.

The "object" or "objects" thus refer to seeds or non-seed and non-grain articles, including plants and plant parts, food articles, biological materials, and industrial articles. The plant or plant parts include, but are not limited to, leaves, stems, roots, plant organs, and seeds of, for example, wheat, rice, corn, soybeans, canola, barley, sorghum, millet, rye, oats, flax, buckwheat, alfalfa, mustard, clover, sunflower, field beans, field peas, forages, coffee, lentils, peanuts, beets, lettuce, and hemp seeds. Food articles include, but are not limited to, fruits and vegetables; for example, produce, apples, potatoes, sugar cane, tea, hemp seeds, cocoa beans, nuts, and sugar beets. Biological matter includes, but is not limited to, insects, microorganisms and cells (e.g., sperm cell morphology).

A number of economically important industrial articles can be analyzed using the invention including, but not limited to, pharmaceuticals, pills, spray droplets, test plates, Petri dishes (colony counting, measuring), bio-tech arrays (including ELISA test plates), water, paper products, plastic pellets, paint, dry powders, wet products, textiles, raw food samples, processed food samples, package goods, parts, general granular samples, and other non-seed commodities.

Specifically for seeds, the invention provides a method and apparatus for classifying the types of seeds in sample, with the level of detail encompassing the class and the specific variety within a class. The present invention incorporates the Canadian wheat classification system, which currently consists of eight classes with varieties within each class. However, the neural network of the present invention can be trained in the same manner for application to other country classification systems, whereby the Graphical User Interface (GUI) engine allows for a switch from one set of calibrations to another (i.e., Canadian vs. American wheat classification systems).

In another embodiment, the invention provides a method and apparatus for identifying or quantifying seeds affected by disease in seeds. In an exemplified case, the invention is specific to fusarium head blight, but optionally, can be trained and modified to assess other diseases, such as ergot, pink smudge, and blackpoint in the same or other specific seed types.

In another embodiment, the invention provides a method and apparatus for identifying or quantifying significant environmental or physiological seed conditions including, but not limited to, sprouted seeds, green seeds, piebald, frost or freezing damaged seeds, weathering and Hard Vitreous Kernels.

In another embodiment, the invention provides a method and apparatus for identifying or quantifying significant handling conditions which will down-grade a sample including, but not limited to, bin burned seeds, cracked, broken and degermed seeds.

In another embodiment, the invention provides a method and apparatus for seed classification tasks involving detection, identification and quantification in a sample including, but not limited to, admixtures of seeds, varietal identification and GMO identification.

In another embodiment, the invention provides a method and apparatus for seed sample characterization tasks involving detection, identification and quantification of sample features including, but not limited to, dockage, milling characteristics and color characterization.

In another embodiment, the invention can be applied to other types of seeds, with an extended range of tasks including sample characterization, classification and analysis of conditions (involving detection, identification and quantification of sample features).

In another embodiment, the invention can be applied to other types of non-seed material applications, with an extended range of tasks including sample characterization, classification and analysis of conditions (involving detection, identification and quantification of sample features).

In yet another embodiment, the discriminatory engine and overall sample analysis strategy of the invention can be applied to other imaging platforms to undertake other types of non-seed material applications, with an extended range of tasks including sample characterization, classification and analysis of conditions (involving detection, identification and quantification of sample features).

An exemplary apparatus which can be used in the present invention is illustrated schematically in FIG. 1, and comprises an image capture device, a seed or object presentation device (hardware presentation e.g., holder, tray, belt), a monitor, and a computer having an executable seed or object analysis program which is written with programming software (e.g., Visual Basic™); image analysis software (e.g., ImageProPlus™); data processing software (e.g., Excel™), and neural network modelling software (e.g., Predict™). A printer can also be added to produce a hardcopy of the results.

Any one of several image capture devices can be used to scan seeds or other objects. In one embodiment, seeds or other objects may be scanned using a CCD array (sensor), or optionally, a large flatbed scanner, digital camera, line scan camera, or CMOS arrays can be used. Any type of object presentation device (e.g., holder, tray, belt) which displays the seeds or other objects in view of the image capture device is suitable. In one embodiment, seeds or other objects for analysis are deposited into a tray or drawer-like holder which is positioned directly underneath an inverted and raised scanner. This particular arrangement is advantageous in preventing light from entering and contaminating the scanned image, and permitting the seeds or other objects to be scanned and a digital image captured.

Orientation of the seeds or other objects themselves is not required and the volume can be physically controlled by pouring more or fewer seeds or other objects into the holder. The actual number of seeds or other objects for scanning is inherently dependent upon the seed or other object of interest, seed or object size and scanning area. In one embodiment of the invention pertaining to seeds, in excess of 3,200 seeds of smaller wheat types have been scanned using an Epson 836XL large format scanner (tabloid size). A conveyor type system can also been used to scan a standard volume ranging from 10,000 to 50,000 seeds.

The image capture device is connected to a computer. A suitable computer can be any modern PC-compatible computer connected to a standard monitor. The computer has an executable seed or object analysis program of the present invention which operates programming software such as Visual Basic™ which is used to execute the logic commands and is linked to application software, such as image analysis software such as ImageProPlus™ which is used for image processing and analysis; data processing software such as Excel™ which provides a template document with worksheets for processing data results; neural network modelling software such as Predict™ with a deployed flash code for the neural network. All software is customized, packaged with a Graphical User Interface (GUI), and written in programming software such as Visual Basic™. Alternatively, other similar application software can also be used.

Any standard printer such as an Hewlett Packard Model Laserjet IV can be connected to the system to furnish a hardcopy of the data and results.

Figure 2:
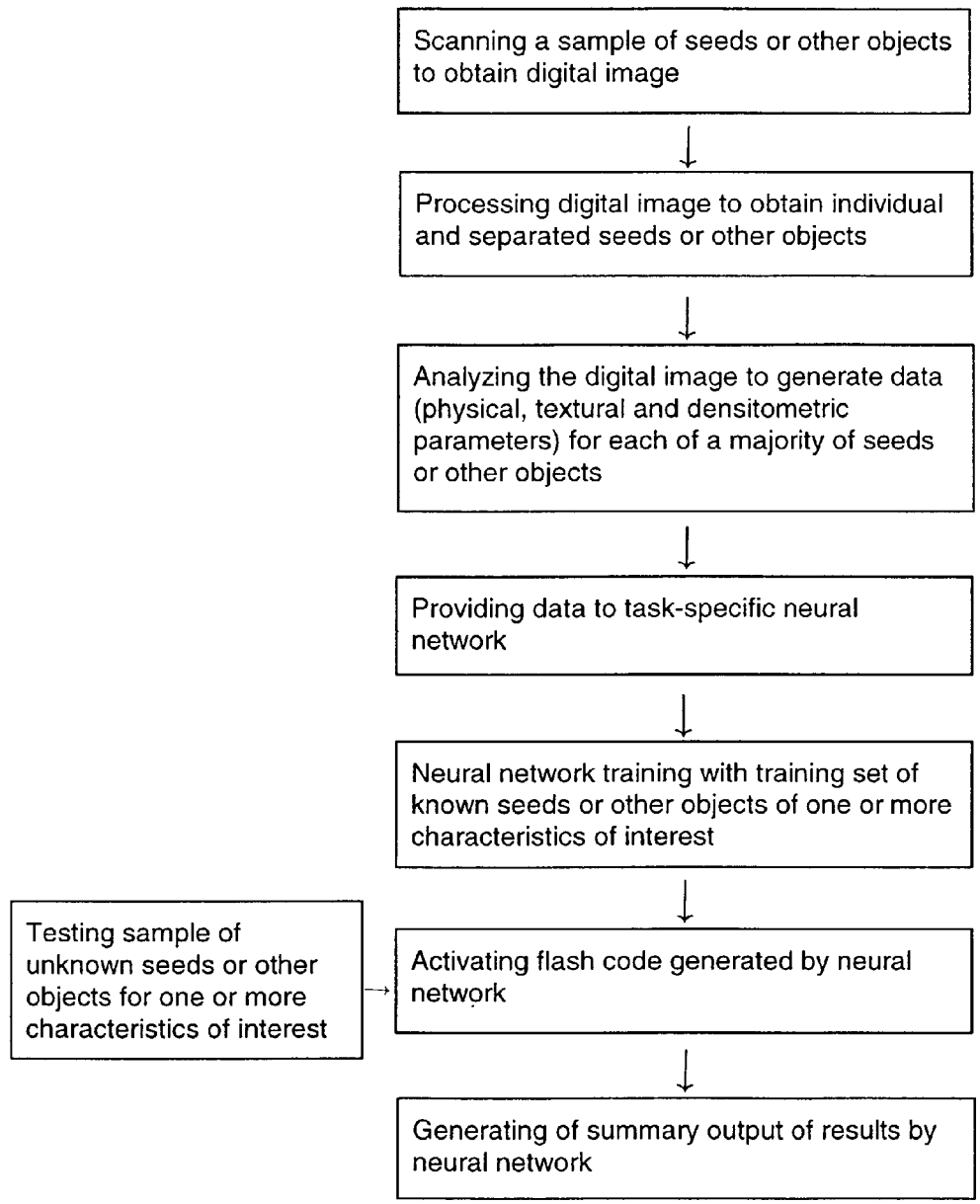
FIG. 2 is a flow diagram which illustrates exemplary fundamental processing and analytical steps to identify and quantify a characteristic of interest in a representative sample of seeds or other objects.

Exemplary processing and analytical steps of the invention are presented schematically in FIG. 2. An overview of the steps for any object is set out as follows, and demonstrated using seeds as an example, although the invention is applicable to seeds or non-seeds and non-grain articles.

The initial step involves calibration of the system (i.e, set-up of optimum scanner parameters and color correction) and training of a single neural network model. Training involves selecting known objects having known values for the one or more characteristics of interest; arranging the known objects into a spectrum according to increasing degree of expression of the one or more characteristics of interest; and segregating the known objects into a first and a second training set corresponding to a predetermined state of the one or more characteristics of interest.

Each of the first and second training sets are imaged against a background to obtain an original digital image for each of the training sets. Each of the digital images comprises pixels representing the known objects, background and any debris, and are processed to identify, separate, and retain the pixels representing the known objects from the pixels representing the background and the pixels representing any debris, and to eliminate the background and any debris.

Processing Steps

Processing begins by detecting an edge of each of the objects and distinguishing each of the objects from the background by applying an edge detection algorithm, and eliminating an outer layer of pixels on the outer circumference of each of the objects and any debris.

Removing some debris and separating each of the objects is then conducted by applying a first digital sieve, which selects the pixels representing each of the objects meeting a predetermined threshold for a first set of one or more image parameters of the objects. The one or more image parameters in the first set are size or shape or both. Each of the objects which are adjacent are then separated by applying an object-splitting algorithm at least once. Distinguishing the objects from the background is then achieved by applying a predetermined threshold to the original digital image to create a binary mask having ON pixels in areas representing each of the objects and OFF pixels in areas representing the background. The ON pixels display intensities represented by values for RGB, while the OFF pixels display intensities represented by RGB values of zero. A Boolean logic command, AND, is then applied to combine the original digital image with the binary mask to create a new digital image. The new digital image thus comprises pixels representing each of the objects and the pixels representing each of the objects have a detected edge.

Removing remaining debris or object anomalies by separating and removing pixels representing remaining debris or object anomalies from pixels representing each of the objects is then achieved by applying a second digital sieve. The second digital sieve selects the pixels representing each of the objects meeting predetermined thresholds for a second set of one or more image parameters including roundness, shape, perimeter convex, aspect ratio, area, area polygon, dendrites, perimeter ratio and maximum radius. A predetermined threshold is then applied to the new digital image to create a binary mask having ON pixels in areas representing each of the objects and OFF pixels in areas representing the background. The ON pixels display intensities represented by values for RGB, while the OFF pixels display intensities represented by RGB values of zero. The Boolean logic command, AND, is then applied and combines the original digital image with the binary mask to create a new digital image, which comprises pixels representing each of the objects. The pixels representing each of the objects have a detected edge.

Analytical Steps

Image analysis of the samples of known seeds or other objects then involves analyzing the pixels representing each of the known seeds or objects to generate data representative of one of more image parameters for each of the known seeds or objects, with the image parameters being dimension, shape, texture, and color. The image parameters of dimension and shape include area, aspect, area/box, major axis, minor axis, maximum diameter, minimum diameter, mean diameter, maximum radius, minimum radius, radius ratio, integrated optical density, length, width, perimeter, perimeter convex, perimeter ellipse, perimeter ratio, area polygon, fractal dimension, minimum feret, maximum feret, mean feret, and roundness. The image parameters of texture include margination, heterogeneity, and lumpiness.

The image parameters of color include density for red, density for green, density for blue, minimum density, maximum density, standard deviation of density, and mean density. Obtaining one or more image parameters of color for the known objects involves generating an outline of the pixels representing each of the objects, and obtaining color spectral information of the pixels representing each of the objects by recording a data set representative of the number of pixels contained in each of the multiplicity of intensity levels contained in each of the RGB color bands that are contained in each of the objects. A command is then executed to calculate the number of pixels in a determined set of ranges in each of the RGB color bands to obtain a value, which is normalized by dividing each band range pixel count by the total pixel count of each image of each of the objects.

The data is then provided to the neural network software to generate multiple candidate neural network models, which can each have a flash code for deployment. An optimal neural network model is then chosen from the multiple candidate neural network models and the corresponding flash code of the optimal neural network model is retained for identifying or quantifying the one or more characteristics of interest of unknown objects having unknown values of the one or more characteristics of interest.

The optimal neural network model is then validated by selecting more than one sample of the known objects having known values for the one or more characteristics of interest, and imaging each sample against a background to obtain an original digital image for each sample. The digital image comprises pixels representing the known objects, background and any debris, and is processed as above to identify, separate, and retain the pixels representing the known objects from the pixels representing the background and the pixels representing any debris, and to eliminate the background and any debris.

The pixels representing each of the known objects are analyzed as above to generate data representative of one or more image parameters for each of the known objects. The data is provided to and analyzed through a chosen flash code deployed from the candidate neural network model. Further steps then comprise evaluating the output data from the flash code for accuracy and repeatability, and choosing and deploying the flash code of the optimal neural network model for identifying or quantifying the one or more characteristics of interest of unknown objects having unknown values of the one or more characteristics of interest.

Analysis of Unknown Objects

Analysis of unknown objects having unknown values of the one or more characteristics of interest then involves imaging the unknown objects against a background to obtain an original digital image, which comprises pixels representing the unknown objects, the background and any debris, and processing the image as above to identify, separate, and retain the pixels representing the unknown objects from the pixels representing the background and the pixels representing any debris, and to eliminate the background and any debris. The pixels representing each of the unknown objects are then analyzed as above to generate data representative of one or more image parameters for each of the unknown objects. The data is then provided to and analyzed through the flash code deployed from the candidate neural network model. The output data (which represents the unknown values of the characteristics of interest of the unknown objects) from the flash code is then received in a predetermined format. The invention is demonstrated using seeds as follows.

A. System Calibration

To ensure accurate image analysis, images with optimum brightness, contrast, resolution and colour spectral characteristics are desired. It is thus important that calibration of the image capture device selected for image acquisition is initially conducted. Since all captured images must share the same characteristics, setup parameters for the chosen image capture device are standardized. The optimum setup parameters are unique to and dependent upon the specific image capture device selected by the user.

In one embodiment of the invention, the parameters of the image capture device (e.g., Epson 836XL) are initially tested and adjusted for focus, exposure, gamma, shadow, threshold, grey balance, intensity, and saturation to obtain a satisfactory image. The background of the image is also adjusted to reflect approximate absolute zero in terms of RGB values, or pure black. Briefly, the test involves scanning a number of representative seeds or other objects with specific quality and color using different parameter settings, and selecting those parameters which generate the optimum image. For seeds, as an example, color data is particularly significant in distinguishing the type of seed (e.g., Red, White, and Durum wheats) and disease (e.g., light colored Fusarium Head Blight as opposed to dark colored Blackpoint). For image standardization, a color standard is thus used, such as the Macbeth ColorChecker calibration strip, of which 20 of the 24 colors typically associated with grain are used in the present invention. Each color has a specific RGB representation or intensities for red (R), green (G), and blue (B) color. These optimum scanner (or image capture device) setup parameters are then saved for later selection via the executable object analysis program during the image analysis step.

Color correction involves modifying the signals representative of the colors in the image to ensure that images are standardized with respect to color. This will ensure the system's longevity, as hardware components could be changed at a later date, yet the image's color characteristics can still be retained.

In addition, in one embodiment, the image capture device (e.g., Epson 836XL) is tested to determine scanner consistency over the entire scan area. An image of the Macbeth Color Calibration strip and entire scan area is acquired and saved. The strip is removed and placed on the right hand side, a few centimeters away from top of scanning surface, and the image is scanned and saved. The steps of repositioning, scanning and saving images are repeated eight times to generate ten saved images.

A Boolean logic command in the imaging software (e.g., ImageProPlus™) then combines these ten images with the previous image (Macbeth Color Calibration strip and entire scan area). Areas of interest (AOI) are set on all black color patches on each standard, and the density (mean) values of R, G and B are measured, with data sent thereafter to the data processing spreadsheet (e.g., Excel™). The same procedure is repeated on all twenty color patches of all eleven color calibration strips, with results indicating that the scans are consistent, with only minor changes in intensities. Alternatively, other strategies to correct color suitable for other scanning devices may be adopted.

The color reference image, or virtual color reference, is obtained in the following manner. An AOI is placed around the color calibration strip, and the area is pasted into graphics software (e.g. Corel PhotoPaint™). A rectangular mask is placed over black color patch of the standard. Mean values of R, G, and B are derived by testing multiple images of the color standard, and these mean R, G, and B values of the black mask are then filled with pixels with only the correct RGB values. The same process is conducted for all other patches to complete the process of generating a representative virtual color standard.

The first step of color correction is to obtain color data from the original scanned image. The program applies a 1 pass filter to smooth the individual color patch such that all RGB values are consistent throughout the entire area. The remaining AOI's are sequentially set and filtered in same manner until all 20 color patches have been processed. All 20 AOI's are set and will be used for color measurement. The program opens an environment file which commands measurement parameters of mean density values of R, G, and B. A range file is loaded, with threshold values to cover entire color spectrum. The 20 AOI's are then analyzed, and the data are sent to the data processing spreadsheet (indicated as "Before Color Correction").

The program then opens the Macbeth Virtual Standard reference image. The RGB color means from the image of the seed or other object are compared and matched to the reference for color correction. Color correction of the image is accomplished by a macro which corrects colors on the original scanned image on the basis of tag points. The RGB colors of the 20 tag points on the image of the seed or other object are compared to the RGB colors of the corresponding 20 points of the virtual reference image. The program notes the mathematical difference of the 20 RGB values and a polynomial fitting equation is employed that adjusts the color values of the entire original image of the seed or other object. This is accomplished by matching its 20 reference points with the "ideal" colors that exist in the virtual color standard. The RGB values of the new image are then sent to the data processing spreadsheet (designated as "After Color Correction"). The "After Color Correction" values are compared to Macbeth Target Values and the differences are shown on the spreadsheet.

Following color calibration of the image capture device, the image is spatially calibrated by determining the area covered by a pixel. In one embodiment of the invention, the pixel measurement is conducted in millimeters, although alternatively, other units such as centimeters or inches may be used. Pixel measurement is conducted by placing a piece of graph paper with lines marked 10 millimeters to the centimeter, on the seed or object presentation device (e.g., tray, holder or belt) such that the height of the paper equals the height of the object tray or holder. Using the scanner (or image capture device) setup parameters, the paper is scanned and the image is saved. The user can then position a reference line over a section of the graph paper and designate the units which the line represents. In the present invention, first and second calibration points are set along the X axis specifically at 0 and 250 mm on the graph paper image, resulting in a calibration reading of 8.6120 pixels/mm. The Y axis is calibrated by setting the first point at 0 mm and the second point at 400 mm on the graph paper image, resulting in a calibration reading of 8.7575 pixels/mm. These X and Y calibration results generate an aspect ratio of 0.9834, which is saved for all subsequent analysis of unknown or test samples of seeds or other objects. In one embodiment, a pixel thus covers 0.1161 (X) by 0.1142 (Y) square millimeters.

B. Samples of Known Seeds or Other Objects i. Training of the Single Neural Network Model with Samples of Known Seeds or Other Objects Using seeds as an example, training of the single neural network model involves initially selecting a number of samples of "known" seeds which represent a chosen variety or multiple sets of similar varieties in a healthy or diseased state of interest, i.e., which have a known value for one or more characteristics of interest.

In one embodiment, the system of the invention can be trained to permit classification of the types of seeds in a sample. The present invention incorporates the Canadian wheat classification system, which currently consists of eight classes with varieties within each class (Table 1). However, the single neural network model of the present invention can be trained in the same manner for application to other country classification systems, whereby the GUI engine allows for a switch from one set of calibrations to another (i.e. Canadian vs. American wheat classification systems).

In another embodiment, the invention provides a method and apparatus for identifying or quantifying seeds affected by disease in seeds. In an exemplified case, the invention is specific to fusarium head blight, but optionally, can be trained and modified to assess other diseases, such as ergot, pink smudge, and blackpoint in the same or other specific seed types.

In another embodiment, the invention provides a method and apparatus for identifying or quantifying significant environmental or physiological seed conditions including, but not limited to, sprouted seeds, green seeds, piebald, frost or freezing damaged seeds, weathering and Hard Vitreous Kernels.

In another embodiment, the invention provides a method and apparatus for identifying or quantifying significant handling conditions which will down-grade a sample including, but not limited to, bin burned seeds, cracked, broken and degermed seeds.

In another embodiment, the invention provides a method and apparatus for seed classification tasks involving detection, identification and quantification in a sample including, but not limited to, admixtures of seeds, varietal identification and GMO identification.

In another embodiment, the invention provides a method and apparatus for seed sample characterization tasks involving detection, identification and quantification of sample features including, but not limited to, dockage, milling characteristics and color characterization.

In another embodiment, the invention can be applied to other types of seeds, with an extended range of tasks including sample characterization, classification and analysis of conditions (involving detection, identification and quantification of sample features).

TABLE 1

Wheat Classes and Varieties for Use with the Invention

| Country of Origin | Class | Varieties | |
|---|---|---|---|
| Canada | CW Red Spring | AC Barrie | Conway |
| | | AC Domain | Katepwa |
| | | AC Eatonia | Lancer |
| | | AC Elsa | Laura |
| | | AC Majestic | Leader |
| | | AC Michael | Mackenzie |
| | | AC Minto | Neepawa |
| | | CDC Teal | Park |
| | | Columbus | Roblin |
| | CW Extra Strong | Bluesky | Laser |
| | | Glenlea | Wildcat |
| | CW Red Winter | AC Readymade | Northstar |
| | | CDC Clair | Tempest |
| | | CDC Kestrel | Sundance |
| | CW Soft White Spring | AC Phil | Fielder |
| | | AC Reed | |
| | CW Amber Durum | AC Avonlea | Kyle |
| | | AC Morse | Medora |
| | | Hercules | |
| | CW Soft White Winter | Mac 1 | 83W017022 |
| | | 586-375 | 83W017024 |
| | | 83W017017 | 83W017026 |
| | | 83W017018 | 83W020006 |
| | | 83W017021 | 83W020007 |
| | CP Spring White | AC Karma | Genesis |
| | | AC Vista | |
| | CP Spring Red | AC Crystal | Biggar |
| | | AC Foremost | Cutler |
| | | AC Taber | Oslo |
| United States | U.S. Varieties | Hard Red—Pioneer 2375 | |
| | | Hard Red—Grandin | |

In one embodiment, training of the neural network involves selecting known seeds having known values for one or more characteristics of interest. The known seeds are arranged into a spectrum according to increasing degree of expression of the one or more characteristics of interest. The known seeds are manually and visually segregated into a first and a second training set corresponding to a predetermined state of the one or more characteristics of interest. The known seeds are further visually segregated into populations according to the known value for one or more characteristics of interest (for example, healthy and diseased) to create at least two known populations. A human expert thus analyses and segregates key physical and/or colour spectral characteristics manifested in each of the known populations of seeds. The seed samples have populations ranging from severely to marginally diseased seeds and from marginally to totally healthy seeds. A division line is designated to delineate the decision threshold which defines whether an individual seed is classified as "healthy" or "diseased," and is thereby used to group each population. This seed segregation and classification process is aided by physically creating a seed spectrum ranging from severely to marginally diseased seeds and from marginally to totally healthy seeds. The spectrum of training sets thus comprises a series of seeds, lined up on a white cardboard background and glued in place.

Using the known spectrum of training sets as a reference, a number of seed samples are prepared, separating seeds into healthy and diseased groups. These known seed samples are imaged (scanned), and the obtained digital images are processed and analyzed as follows.

ii. Image Processing of the Samples of Known Seeds or Other Objects

In addition to containing the seeds or other objects of interest, a sample of seeds or other objects may usually include debris or clumps of seeds or objects. For example, a sample of seeds may usually include debris, aberrant seeds, broken seeds, seed detritus, dust, large clumps of inseparable seeds and atypical seed particles. Such material is problematic in that it may distort the image features of the seeds or other objects that are to be analyzed, leading to inaccurate data related to the sample of the seeds or other objects. The present invention thus provides steps to modify the original digital image to acquire a clear, precise image which is suitable for analysis and contributes to the accuracy of the data.

The first stage of image processing thus involves extracting the seeds from the background, with an edge detection strategy. The image of the seeds is first eroded with a 3×3 erode filter, 1 pass, and 10 strength, which eliminates a small area on the outer circumference of each seed, hence aiding in seed definition and separation. A single outer layer of pixels affected by scanned edge effects is then eliminated. A known filter algorithm (e.g., SOBEL or ROBERTS) is applied to detect the edge of the seed's image. A thresholded binary mask is made of the seed-only areas, whereby it is determined whether each pixel has a color intensity value above (pixel is "on," thus designated the binary code of "1") or below a threshold value (pixel is "off," thus designated the binary code of "0"). This black background of the image serves to distinguish a non-seed from a true seed, and define the edge of a seed. Further, a Boolean operator is applied, using an "AND" expression, is used to overwrite the original "Color corrected" image with itself and the eroded mask image. This results in a final image that only has the edge-detected seed entities having numerical RGB color values, and the background with RGB value of 000 (black).

The next step involves preferably two digital "sieves," referred to as a first level sieve and a second level sieve. The program selects specific size and shape thresholds for the particular seed being analyzed. A first level sieve removes debris and dust in accordance with the set threshold for size and shape. Within this process, any entity touching the edge of the image is deleted along with the debris in the Boolean logic. Preferably for wheat seeds, the threshold is set at less than 5 mm$^2$; thus, any material less than 5 mm$^2$ in size or less than the size of an individual seed of interest is eliminated. A Boolean operator is applied, using an "AND" expression with this original image. This results in a final image that only has the edge-detected seed entities having areas that are larger than 5 mm$^2$.

The next step involves separating adjoining seeds which may be present in a seed sample and require separation. The present invention provides an "auto-split" function which separates adjoining seeds unless the common boundary or projected edge of a touching seed is too extensive. Preferably for wheat seeds, activation of the auto-split function at least once provides optimum accuracy and efficiency.

Next, a second level sieve removes anomalies remaining after the auto-split function such as overlaps, clumps, aberrant splits or broken seeds. While the first level sieve is based upon thresholds of size and shape, the second level sieve is focused upon thresholds for roundness, shape, perimeter (convex), aspect ratio, area, area (polygon), dendrites, perimeter (ratio), and radius (max). Using the parameter of area for example, the sieve size is set from 3 to 28 mm$^2$, such that material within this range is considered. The ranges are dependent upon the seed of interest. For wheat seeds, 3 mm$^2$ is a suitable as a lower limit since a whole wheat seed is usually larger that 5 or 6 mm$^2$. An upper limit of 28 mm$^2$ permits only single wheat seeds to be retained for consideration. These sieving steps thus provide flexibility in that the user may select which parameters and thresholds are applicable to a specific seed of interest, as other grain types have different sieving parameters. A thresholded binary mask is generated of this sieved seed image (with adjoining seeds split apart). A Boolean operator is applied, using an "AND" expression, to overwrite the dust free "Color corrected" image with itself. This results in a final image that only has the edge-detected seed entities, having numerical RGB color values and the background with RGB value of 000 (black). It also contains no dust or debris, and no seed clumps or aberrant shaped seeds.

iii. Image Analysis of the Samples of Known Seeds or Other Objects

Next, the seed analysis program opens an environment file including 34 dimensional, shape, textural, and densitometric parameters as shown in Table 2. Optionally, other parameters of interest can be selected. The program then opens a range file, which sets the ranges of R, G and B to values of 1,0 and 0 respectively. This selects only the seeds, and they are then "measured" and counted. In addition, color spectral data is obtained for each seed based on its RGB histogram and defined ranges of the three colors (R, G, and B).

iv. Obtaining Spectral Data for the Samples of Known Seeds or Other Objects

During the prior image processing and analysis steps, an outline file containing the outlines of each individual object/seed in the image is generated by delineating the outline of the seeds (outer layer of pixels). Using each outline, a RGB histogram of the individual object/seed pixels is created. This is a histogram data set that records the number of pixels contained in each of the 0 to 255 intensity levels for each of the colors (R, G and B) that is contained in the individual object/seed. This data is sent to the clipboard as a string variable (series of data) and it is parsed into an array (matrix) of data. A RGB range file exists, for all types of analyses, which defines the RGB ranges specified for the analysis. A command in the seed analysis program is invoked which gives the sums of the pixels in the particular

TABLE 2

Physical, Textural, and Densitometric Parameters Generated From Image Analysis

| | | |
|---|---|---|
| Physical parameters | Area | Size (length) |
| | Aspect | Size (width) |
| | Area/Box | Perimeter |
| | Axis (major) | Perimeter (convex) |
| | Axis (minor) | Perimeter (ellipse) |
| | Diameter (max) | Perimeter (ratio) |
| | Diameter (min) | Area (polygon) |
| | Diameter (mean) | Fractal dimension |
| | Radius (max) | Feret (min) |
| | Radius (min) | Feret (max) |
| | Radius Ratio | Feret (mean) |
| | Integrated Optical Density | Roundness |
| Textural parameters | Margination | |
| | Heterogeneity | |
| | Clumpiness | |
| Densitometric parameters | Density (red) | Density (min) |
| | Density (green) | Density (max) |
| | Density (blue) | Density (std. dev.) |
| | | Density (mean) | range (e.g. "R" band intensities from 0 to 99). This is a count of the specific pixels. This value is "normalized" by dividing each band pixel count by the specific seed's total pixel count. The output of this band information is to a data output file (text, tab delimited).

Data obtained from the above steps (ii) and (iii) from the known samples are then used by the neural network application software to generate many versions of neural network solutions (flash code), with various neural network variables being expertly manipulated. A "best net" is chosen, based on several characteristics of the net (e.g. its accuracy, overall architecture, and rational use of significant parameters). This flash code is then used for validating subsequent known validation sets and the overall accuracy and repeatability of the net is evaluated. The final net chosen to be deployed to the system is a decision based on the testing on nets and choosing one with the best performance.

C. Testing of the Samples of Unknown Seeds or Other Objects i. Image Processing of the Samples of Unknown Seeds or Other Objects Testing of one or more samples of unknown seeds or other objects having an unknown value of the one or more characteristics of interest comprises the same steps as Sections B (ii), (iii) and (iv) used for known seeds. Briefly, the samples of unknown seeds or other objects having an unknown value of the one or more characteristics of interest are scanned to obtain a digital image. The digital image, for example, of the unknown seeds is processed to obtain images of defined and separated individual seeds, wherein image processing comprises eliminating an outer layer of pixels (preferably a single layer) on the outer circumference of each seed; detecting the edge of each seed using a filter algorithm; distinguishing each seed from a non-seed by applying a thresholded binary mask and Boolean operator to determine pixel color intensity values of each seed against the black background; removing debris by applying a first level sieve, wherein only those seeds meeting the set thresholds for size and shape are isolated; separating adjacent seeds by applying an auto-split function, and removing anomalies by applying a second level sieve, wherein only those seeds meeting the set thresholds of roundness, shape, perimeter (convex), aspect ratio, area, area (polygon), dendrites, perimeter (ratio), and radius (max) are isolated.

ii. Image Analysis of the Samples of Unknown Seeds or Other Objects

Following processing of the unknown seed samples as summarized above, the seed or object analysis program opens an environment file including the 34 parameters of Table 2. The program then opens a range file, which sets the ranges of R, G and B to values of 1,0 and 0 respectively. This selects only the seeds, and they are then "measured" and counted. The next step is to obtain spectral data for the unknown seeds.

iii. Obtaining Spectral Data for the Samples of Unknown Seeds or Other Objects

During the prior image processing and analysis steps, an outline file containing the outlines of each individual object/seed in the image is generated by delineating the outline of the seeds (outer layer of pixels). Using each outline, a RGB histogram of the individual object/seed pixels is created. This is a histogram data set that records the number of pixels contained in each of the 0 to 255 intensity levels for each of the colors (R, G and B) that is contained in the individual object/seed. This data is sent to the clipboard as a string variable (series of data) and it is parsed into an array (matrix) of data. A RGB range file exists, for all types of analyses, which defines the RGB ranges specified for the analysis. A command in the seed or object analysis program is invoked which gives the sums of the pixels in the particular range (e.g. "R" band intensities from 0 to 99). This is a count of the specific pixels. This value is "normalized" by dividing each band pixel count by the specific seed's total pixel count. The output of this band information is to a data output file (text, tab delimited).

iv. Analysis of the Data from the Samples of Unknown Seeds or Other Objects by the Neural Network The extracted data from step (iii) of the unknown seed samples is then provided to the task-specific neural network, which has been previously trained with a training set of known seeds as described previously in Section A. The object analysis program activates the neural network decision engine, such that the neural network conducts an analysis of the extracted data from step (iii), reaches decisions regarding the extracted data, and generates a summary output of results, wherein the values of the one or more characteristics or parameters of interest for the unknown seeds are provided.

D. Applications of the System

The invention described herein is applicable to a variety of tasks pertaining to seeds and non-seeds. For seeds, identification and quantification of significant environmental or physiological seed conditions can be conducted, with the neural network being trained to identify and quantify economically significant environmental or physiological seed conditions (e.g. green seeds, piebald, frost or freezing damaged seeds, weathering, or Hard Vitreous Kernels). Further, the invention can achieve identification and quantification of handling conditions that will down-grade a sample (e.g. bin burned seeds, cracked, broken, or degermed seeds); and seed classification tasks involving detection, identification and quantification in a sample (e.g. admixtures of seeds, varietal identification, GMO identification). In addition, the invention is applicable to seed sample characterization tasks involving detection, identification and quantification of sample features (e.g. dockage, milling characteristics, color characterization). The invention can be applied to other types of seeds, with an extended range of tasks including sample characterization, classification and analysis of conditions (involving detection, identification and quantification of sample features).

Although the invention is described herein for the characterization of seeds, it will be appreciated that the invention is equally useful for the characterization of other objects. In addition, since the system can be modified and trained for imaging and analyzing any different object, it is further applicable to the characterization of non-seed or non-grain articles, including foods (e.g., produce such as fruits and vegetables), plants and plant parts (e.g., leaves, stems, plant organs, seeds), and biological materials (e.g., cells and tissues).

There is a broad range of applications that the discriminatory engine and overall sample analysis strategy that is employed by the existing seed analysis system can be used (by other imaging platforms) to undertake other types of non-seed material applications. This range of tasks includes sample characterization, classification and analysis of conditions (involving detection, identification and quantification of sample features). This includes a variety of hardware platforms (e.g., microscopes, ultrasound, macro stands, etc.). It also includes a variety of imaging generating devices (e.g., CCD cameras, CCD arrays, CMOS detectors, line scan cameras, video cameras, X-ray devices, CAT scan devices, Infra Red thermography devices, etc.).

It will be appreciated that the invention is applicable to biomedical or other life science applications, such as cell analysis, classification, or counting; for example, cells may be analyzed for the detection or diagnosis of disease, and classification or counting, such as red, white or other types of blood cells.

The invention is further illustrated by the following non-limiting example and applications.

EXAMPLE 1

Identification and Quantification of Disease Conditions of Seeds (e.g. Fusarium Head Blight)

Equipment:

The hardware components of the system included a PC computer; monitor; Epson 836XL large format scanner (tabloid size); tray; and a printer. The software included the seed or object analysis program; programming software (Visual Basic™); image analysis software (ImagePro-Plus™); data processing software (Excel™); and neural network modelling software (Predict™). The scanner was inverted and raised so that the tray of seeds was positioned directly underneath.

Procedure:

The invention was used to identify and quantify a disease condition known as Fusarium Head Blight in wheat seeds. The system was first trained by providing the neural network with two populations, namely healthy and diseased. These known samples were placed into the tray and scanned to obtain a digital image.

The digital image was then processed by initially extracting the seeds from the background using edge detection. The image of the seeds was first eroded with a 3×3 erode filter, 1 pass, and 10 strength, which eliminated a small area on the outer circumference of each seed. A single outer layer of pixels affected by scanned edge effects is then eliminated. A known filter algorithm (e.g., SOBEL or ROBERTS) was applied to detect the edge of the seed's image.

A thresholded binary mask was then made of the seed-only areas, whereby it was determined whether each pixel had a color intensity value above (pixel was "on," thus designated the binary code of "1") or below a threshold value (pixel was "off," thus designated the binary code of "0"). This black background of the image served to distinguish a non-seed from a true seed, and defined the edge of a seed. Further, a Boolean operator was applied, using an "AND" expression, to overwrite the original "Color corrected" image with itself and the eroded mask image. This resulted in a final image which had only the edge-detected seed entities having numerical RGB color values, and the background with RGB value of 000 (black).

Debris and dust were then removed from the image by applying a first level sieve. The threshold was set at less than 5 mm$^2$. A Boolean operator "AND" was then applied to this original image to obtain a final image having only the edge-detected seed entities with areas larger than 5 mm$^2$. The adjoining seeds were then separated by activating the "auto-split" function at least seven times.

A second level sieve was then applied to remove anomalies remaining after the "auto-split" function. The sieve size was set from 3 to 28 mm$^2$, such that only material within this range was considered. A thresholded binary mask was generated of this sieved seed image (with adjoining seeds split apart). A Boolean operator using an "AND" expression was then applied to overwrite the dust free "Color corrected" image with itself, and to obtain a final image which had only the edge-detected seed entities, having numerical RGB color values and the background with RGB value of 000 (black).

The digital image was then analyzed. The program opened an environment file including the preferred 34 parameters of Table 2. The program then opened a range file, which set the ranges of R, G and B to values of 1,0 and 0 respectively. This selected only the seeds, which were then "measured" and counted.

A set of color parameters was then generated for each seed. An outline file containing the outlines of each individual seed in the image was generated. Using each outline, a RGB histogram of the individual seed pixels was created. This histogram data set recorded the number of pixels contained in each of the 0 to 255 intensity levels for each of the colors (R, G and B) contained in the individual seed. This data was sent to the clipboard (reservoir of memory) as a string variable (series of data) and was parsed into an array (matrix) of data. A RGB range file which defines the RGB ranges specified for the analysis was activated. A command in the programming software (e.g., Visual Basic™) which provides the sums of the pixels in the particular range (e.g. "R" band intensities from 0 to 99) was then invoked. This value was "normalized" by dividing band pixel count by the specific seed's total pixel count. The output of this band information was sent to a data output (text, tab delimited) file.

Data from the known seed samples was then used by the neural network application software to generate many versions of neural network solutions (flash code), with various neural network variables being expertly manipulated. A "best net" was chosen, based on several characteristics of the net (e.g. its accuracy, overall architecture, and rational use of significant parameters). This flash code was then used for validating subsequent known validation sets and the overall accuracy and repeatability of the net was evaluated. The final net chosen to be deployed to the system was a decision based on the testing on nets and choosing one with the best performance.

The unknown seed sample "FHB unknown AC Barrie sample #14" was then placed into the tray and scanned to obtain a digital image. The digital image was processed using the same steps as those used for the known seed samples. The digital image was then analyzed. The program opened an environment file including the preferred 34 parameters of Table 2. The program then opened a range file, which set the ranges of R, G and B to values of 1,0 and 0 respectively. This selected only the seeds, which were then "measured" and counted.

A set of color parameters was then generated for each seed. An outline file containing the outlines of each individual seed in the image was generated. Using each outline, a RGB histogram of the individual seed pixels was created. This histogram data set recorded the number of pixels contained in each of the 0 to 255 intensity levels for each of the colors (R, G and B) contained in the individual seed. This data was sent to the clipboard (reservoir of memory) as a string variable (series of data) and was parsed into an array (matrix) of data. A RGB range file exists which defines the RGB ranges specified for the analysis. A command in the seed analysis program which provides the sums of the pixels in the particular range (e.g "R" band intensities from 0 to 99) was then invoked. This value was "normalized" by dividing band pixel count by the specific seed's total pixel count. The output of this band information was sent to a data output (text, tab delimited) file.

Data from the known samples was then used by the neural network application software to generate many versions of neural network solutions (flash code). Activating the flash code generated by the neural network permitted the seed data to be evaluated. Following decision-making by the neural network, a summary output of results was generated (Table 3).

Results:

The results from the above imaging, processing, and analysis of FHB unknown AC Barrie sample #14 are presented in Table 3. The total number of seeds was counted as 3,198, with the number of healthy seeds being 3,191 or 99.78% and the number of diseased seeds determined as 7 or 0.22%.

TABLE 3

Data output from an analysis of a seed sample for Fusarium Head Blight

| | |
|---|---|
| Task: | Disease—Fusarium Head Blight in wheat |
| Class: | CWRS (Canadian Western Red Spring) |
| Variety: | AC Barrie |
| File name: | FHB unknown AC Barrie sample #14 |
| Total number of seeds: | 3,198 |
| Number of Healthy seeds: | 3,191 |
| Number of FHB Diseased seeds: | 7 |
| Percent Healthy seeds: | 99.78% |
| Percent FHB Diseased: | 0.22% |

Application 2

Identification and Quantification of Significant Environmental or Physiological Seed Conditions (e.g., Sprouted Seeds, Green Seeds, Piebald, Frost or Freezing Damaged Seeds, Weathering, or Hard Vitreous Kernels)

The training of the neural network to identify and quantify economically significant environmental or physiological seed conditions is similar to that described in Example 1 (seed diseases), with the exception being that the characteristic of interest, for which the neural network is trained, represents an environmental or physiological condition instead of a disease. The same training and testing steps are involved.

This training involves collecting seeds which represent a chosen variety, or multiple sets of similar varieties and in either a healthy state or in a state that manifests the range or degrees of a particular environmental or physiological seed condition (e.g., sprouted seeds, green seeds, piebald, frost or freezing damaged seeds, weathering, or Hard Vitreous Kernels). Briefly, this training involves manually and visually sorting seeds into two populations, namely healthy and environmentally affected. These known samples are scanned to obtain an image which is then processed and analyzed. The data is used by the neural network application software to generate a "best net" solution for the task. This is deployed into the system, evaluated and validated by numerous tests. The unknown seeds are scanned to obtain an image which is then processed and analyzed. The neural network then analyzes the extracted data of the unknown seeds to determine the value of the one or more environmental or physiological parameters of interest of the unknown seeds.

Application 3

Identification and Quantification of Handling Conditions that will Down-grade a Sample (e.g., Bin Burned Seeds)

The training process to identify and quantify handling conditions that will down-grade a sample (e.g., bin burned seeds, cracked, broken, or degermed seeds) is similar to that described in Example 1 (seed diseases), with the exception being that the characteristic of interest, for which the neural network is trained, represents a handling condition. The same training and testing steps are involved.

Application 4

Seed Classification Tasks Involving Detection, Identification and Quantification in a Sample (e.g., Admixtures of Seeds, Varietal Identification, GMO Identification)

There is a broad range of classification tasks that the invention can perform, involving detection, identification and quantification of seed type.

The training process of the neural network to accomplish seed classification tasks, involving detection, identification and quantification in a sample (e.g., admixtures of seeds, varietal identification, GMO identification), is similar to that described in Example 1 (seed diseases), with the exception being that the characteristic of interest, for which the neural network is trained, represents seed type. The same training and testing steps are involved.

Training involves collecting seeds which represent a chosen variety or class, or multiple sets of similar varieties or classes. Briefly, this involves manual sorting of the samples into two populations, determined by the classification task. To accommodate various expressions of a class or variety sample, the seeds usually are selected from various geographical regions. These known seeds are scanned to obtain images which are then processed and analyzed. The data is used by the neural network application software to generate a "best net" solution for the task. This is deployed into the system, evaluated and validated by numerous tests.

The invention is applicable to the following classification tasks:

classification of a seed sample to a particular class of seeds (e.g., in wheat, CW Red Spring vs. CW Extra Strong; CP Spring Red vs. CW Extra Strong; CW Red Winter vs. CW Red Spring);

classification of a specific variety vs. another group or class of seeds (e.g., for distinguishing new Hard White Spring Wheat lines BW264 and BW263 from CWSWS or CWRS varieties; new CPSR FHB-resistant wheat line (HY644) from AC Crystal CPSR; normal CWAD and the new strong gluten type as currently represented by AC Navigator).

detection, identification and quantification of a mixture of seed classes in a seed sample (e.g., 5% CW Amber Durum in CW Red Spring).

seed classification to variety (e.g. classification of a seed sample a variety, or to a diagnostically similar variety (group of varieties) within a particular class of seeds).

identification of seed types and mixtures of different types (e.g., wheat, barley, oats, rye, etc.).

classification functions in barley (e.g., for distinguishing between 6 and 2 row types; feed and malt types; for distinguishing between various malt varieties).

classification function for oilseed (e.g., mustard (oriental mustard) vs. the canola quality type, and determination of contamination).

detection and identification of genetically modified organism samples (GMO).

The most promising and easily implemented approach is to basically to match a seed sample with a known list of GMO's, based on the sample's characteristics. There are only a few GMO's in current use, and only a few new varieties are anticipated in the near future. If one knows the characteristics of the GMO's, then one can determine two important things about the seed sample being analyzed. The seed sample either, "has characteristics indicating that it is a potential GMO", or the seed sample "does not have characteristics of any known GMO and is probably not a GMO variety." This information is valuable in that it can save the time and cost associated with complex biotech analysis.

Another GMO application, in this context, is the anticipation of biotech bioassays being provided in a "kit" form. The invention can be trained to accurately "read" these bioassays and incorporate the results into a data set. Other strategies can include, but are not limited to, physically employing a dye or stain to aid GMO detection; genetically inserting a fluorescing marker on the seed coat that would be optically detected in the case of a GMO being analyzed; or breeding in an other type characteristic marker that readily identifies the sample as a GMO, preserving its identity (e.g., shape).

Application 5

Seed Sample Characterization Tasks Involving Detection, Identification and Quantification of Sample Features (e.g., Dockage, Milling Characteristics, Color Characterization)

There is a broad range of seed characterization tasks that the invention can perform. These involve detection, identification and quantification of seed sample characteristics (e.g., dockage, milling characteristics, color characterization).

The training process for the capability to undertake seed characterization tasks, involving detection, identification and quantification of seed sample characteristics (e.g., dockage, milling characteristics, color characterization), is similar to that described in Example 1 (seed diseases). The same training and testing steps are involved.

The invention is applicable to the following characterization tasks:

dockage, namely detection, identification and quantification of other non-seed particulate matter or contamination occurring in a seed sample, including, but not limited to insect body parts, rodent feces, other seed species such as weeds, dirt and dust, other plant parts, or other foreign entities.

milling characteristics, such as quantification of size and shape ranges of the seeds present in a seed sample, which is an important consideration for milling and impacts the overall value of many seed types.

color characterization, such as characterization (quantification) of the colour of the seeds present in a seed sample, which is an important consideration for seeds, such as canola, and impacts the overall value of these seed types.

oats characterization, for example determination of reading on hull % and kernel plumpness.

Application 6

Application of the Invention to Other Types of Seeds, with an Extended Range of Tasks Including Sample Characterization, Classification and Analysis of Conditions (Involving Detection, Identification and Quantification of Sample Features).

There is a broad range of applications of the invention for use with other types of seeds. This range of tasks includes sample characterization, classification and analysis of conditions (involving detection, identification and quantification of sample features).

The training process of the seed analysis system for the capability to undertake these tasks with other seed types, is similar to that described in Example 1 (seed diseases). The same training and testing steps are involved.

A number of other economically important seed commodities can be analyzed using the invention including, but not limited to, wheat, rice, corn, soybeans, canola, barley, sorghum, millet, rye, oats, flax, buckwheat, alfalfa, mustard, clover, sunflower, field beans, field peas, forages, coffee, lentils, peanuts, beets, lettuce, hemp seeds and other seed commodities.

Application 7

Employment of the Invention to Other Types of Non-seed Material Applications, with an Extended Range of Tasks Including Sample Characterization, Classification and Analysis of Conditions (Involving Detection, Identification and Quantification of Sample Features).

There is a broad range of applications of the invention for use with other types of non-seed material analysis. This range of tasks includes sample characterization, classification and analysis of conditions (involving detection, identification and quantification of sample features).

The training process for the capability of the invention to undertake these tasks with other types of non-seed material analysis, is similar to that described in Example 1 (seed diseases). The same training and testing steps are involved.

This involves collecting a number of samples of typical material, which represents chosen degrees of the manifestation of the characteristic task required. Basically, this involves manual sorting of the samples determined by the characteristics of the task at hand. These known samples are scanned, images are obtained, processed and analyzed. The data is used by the neural network application software to generate a "best net" solution for the task. This is deployed into the system, evaluated and validated by numerous tests.

A number of economically important non-seed material commodities can be analyzed using the invention including, but not limited to, plant or plant parts (leaves, stems, roots, plant organs); food articles (fruits and vegetables such as produce, apples, potatoes, sugar cane, tea, hemp seeds, cocoa beans, nuts, sugar beets); biological matter (insects, microorganisms, cells); industrial materials such as pharmaceuticals, pills, spray droplets, test plates, Petri dishes (colony counting, measuring), bio-tech arrays (including ELISA test plates), water, paper products, plastic pellets, paint, dry powders, wet products, textiles, raw food samples, processed food samples, package goods, parts, general granular samples, and other non-seed material commodities.

Application 8

Employment of the Discriminatory Engine and Overall Sample Analysis Strategy of the Invention to Other Imaging Platforms to Undertake Other Types of Non-seed Material Applications, with an Extended Range of Tasks Including Sample Characterization, Classification and Analysis of Conditions (Involving Detection, Identification and Quantification of Sample Features).

There is a broad range of applications that the discriminatory engine and overall sample analysis strategy of the invention can be used (by other imaging platforms) to undertake other types of non-seed material applications. This range of tasks includes sample characterization, classification and analysis of conditions (involving detection, identification and quantification of sample features). This includes a variety of hardware platforms (e.g., microscopes, ultrasound, macro stands, etc.). It also includes a variety of imaging generating devices (e.g., CCD cameras, CCD arrays, CMOS detectors, line scan cameras, video cameras, X-ray devices, CAT scan devices, Infra Red thermography devices, etc)

The training process for the capability of the invention to undertake these tasks with other types of non-seed material analysis, is similar to that described in Example 1 (seed diseases). The same training and testing steps are involved.

This involves collecting a number of samples of typical material, which represents chosen degrees of the manifestation of the characteristic task required. Basically, this involves manual sorting of the samples determined by the characteristics of the task at hand. These known samples are scanned to obtain images which are then processed and analyzed. The data is used by the neural network application software to generate a "best net" solution for the task. This is deployed into the system, evaluated and validated by numerous tests.

A number of economically important non-seed material commodities can be analyzed using the invention including, but not limited to, plant or plant parts (leaves, stems, roots, plant organs); food articles (fruits and vegetables such as produce, apples, potatoes, sugar cane, tea, hemp seeds, cocoa beans, nuts, sugar beets); biological matter (insects, microorganisms, cells); industrial materials such as pharmaceuticals, pills, spray droplets, test plates, Petri dishes (colony counting, measuring), bio-tech arrays (including ELISA test plates), water, paper products, plastic pellets, paint, dry powders, wet products, textiles, raw food samples, processed food samples, package goods, parts, general granular samples, and other non-seed material commodities.

REFERENCES

PATENT DOCUMENTS

Oste, R., Egelberg, P., Peterson, C., Svensson, E. and Monsson, O. Methods and Devices for Automatic Assessment of Corn. U.S. Pat. No. 5,898,792, issued Apr. 27, 1999.

Satake, S., Baishiki, R. S., and Moser, J. M. Grain inspection and analysis apparatus and method. U.S. Pat. No. 5,917,927, issued Jun. 29, 1999.

Sistler, F. E. and Wright; M. E. System and Process for Grain Examination. U.S. Pat. No. 4,975,863, issued Dec. 4, 1990.

All publications mentioned in this specification are indicative of the level of skill in the art to which this invention pertains. To the extent they are consistent herewith, all publications mentioned in this specification are herein incorporated by reference to the same extent as if each individual publication was specifically and individually indicated to be incorporated by reference. No admission is made that any cited reference constitutes prior art.

We claim:

1. A method for identifying or quantifying one or more characteristics of interest of unknown objects, comprising the steps of:

A training of a single neural network model with a first and a second training set of known objects having known values for the one or more characteristics of interest by selecting known objects having known values for the one or more characteristics of interest;

arranging the known objects into a spectrum according to increasing degree of expression of the one or more characteristics of interest;

segregating the known objects into a first and a second training set corresponding to a predetermined state of the one or more characteristics of interest;

imaging each of the first and second training sets to obtain an original digital image for each of the training sets;

processing and analyzing the original digital image to generate data representative of one or more image parameters for each of the known objects; providing the data to neural network software to generate multiple candidate neural network models; and choosing an optimal neural network model from the multiple candidate neural network models;

B validating the optimal neural network model by selecting more than one sample of the known objects having known values for the one or more characteristics of interest;

imaging each sample to obtain an original digital image for each sample;

processing and analyzing the digital image to generate data representative of one or more image parameters for each of the known objects;

providing the data to the optimal neural network model to evaluate output data for accuracy and repeatability; and C analyzing unknown objects having unknown values of the one or more characteristics of interest, comprising the steps of:

I imaging the unknown objects having unknown values of the one or more characteristics of interest against a background to obtain an original digital image, wherein the original digital image comprises pixels representing the unknown objects, the background and any debris;

II processing the original digital image to identify, separate, and retain the pixels representing the unknown objects from the pixels representing the background and the pixels representing any debris, and to eliminate the background and any debris;

III analyzing the pixels representing each of the unknown objects to generate data representative of one or more image parameters for each of the unknown objects;

IV providing the data to a chosen flash code deployed from the candidate neural network model;

V analyzing the data through the flash code; and

VI receiving the output data from the flash code in a predetermined format, wherein the output data represents the unknown values of the one or more characteristics of interest of the unknown objects.

2. A method for training of a single neural network model with a first and second training set of known objects having known values for the one or more characteristics of interest, comprising the steps of:

A I selecting known objects having known values for the one or more characteristics of interest;

II arranging the known objects into a spectrum according to increasing degree of expression of the one or more characteristics of interest;

III segregating the known objects into a first and a second training set corresponding to a predetermined state of the one or more characteristics of interest;

IV imaging each of the first and second training sets against a background to obtain an original digital image for each of the training sets, wherein each of the original digital images comprises pixels representing the known objects, background and any debris;

V processing the original digital image to identify, separate, and retain the pixels representing the known objects from the pixels representing the background and the pixels representing any debris, and to eliminate the background and any debris;

VI analyzing the pixels representing each of the known objects to generate data representative of one or more image parameters for each of the known objects;

VII providing the data to the neural network software to generate multiple candidate neural network models, wherein the multiple candidate neural network models each can have a flash code for deployment; and VIII choosing an optimal neural network model from the multiple candidate neural network models and retaining the corresponding flash code of the optimal neural network model for identifying or quantifying the one or more characteristics of interest of unknown objects having unknown values of the one or more characteristics of interest; and B validating the optimal neural network model comprising the steps of:

I selecting more than one sample of the known objects having known values for the one or more characteristics of interest;

II imaging each sample against a background to obtain an original digital image for each sample, wherein the original digital image comprises pixels representing the known objects, background and any debris;

III processing the original digital image to identify, separate, and retain the pixels representing the known objects from the pixels representing the background and the pixels representing any debris, and to eliminate the background and any debris;

IV analyzing the pixels representing each of the known objects to generate data representative of one or more image parameters for each of the known objects;

V providing the data to a chosen flash code deployed from the candidate neural network model;

VI analyzing the data through the flash code;

VII evaluating the output data from the flash code for accuracy and repeatability;

VIII choosing and deploying the flash code of the optimal neural network model for identifying or quantifying the one or more characteristics of interest of unknown objects having unknown values of the one or more characteristics of interest.

3. A method for identifying or quantifying one or more characteristics of interest of unknown objects comprising the steps of:

A training of a single neural network model with a first and a second training set of known objects having known values for the one or more characteristics of interest, wherein training of the single neural network model comprises the steps of:

I selecting known objects having known values for the one or more characteristics of interest;

II arranging the known objects into a spectrum according to increasing degree of expression of the one or more characteristics of interest;

III segregating the known objects into a first and a second training set corresponding to a predetermined state of the one or more characteristics of interest;

IV imaging each of the first and second training sets against a background to obtain an original digital image for each of the training sets, wherein each of the original digital images comprises pixels representing the known objects, background and any debris;

V processing the original digital image to identify, separate, and retain the pixels representing the known objects from the pixels representing the background and the pixels representing any debris, and to eliminate the background and any debris;

VI analyzing the pixels representing each of the known objects to generate data representative of one or more image parameters for each of the known objects;

VII providing the data to the neural network software to generate multiple candidate neural network models, wherein the multiple candidate neural network models each can have a flash code for deployment; and VIII choosing an optimal neural network model from the multiple candidate neural network models and retaining the corresponding flash code of the optimal neural network model for identifying or quantifying the one or more characteristics of interest of unknown objects having unknown values of the one or more characteristics of interest; and B validating the optimal neural network model comprising the steps of:

I selecting more than one sample of the known objects having known values for the one or more characteristics of interest;

II imaging each sample against a background to obtain an original digital image for each sample, wherein the original digital image comprises pixels representing the known objects, background and any debris;

III processing the original digital image to identify, separate, and retain the pixels representing the known objects from the pixels representing the background and the pixels representing any debris, and to eliminate the background and any debris;

IV analyzing the pixels representing each of the known objects to generate data representative of one or more image parameters for each of the known objects;

V providing the data to the chosen flash code deployed from the candidate neural network model;

VI analyzing the data through the flash code;

VII evaluating the output data from the flash code for accuracy and repeatability;

VIII choosing and deploying the flash code of the optimal neural network model for identifying or quantifying the one or more characteristics of interest of unknown objects having unknown values of the one or more characteristics of interest; and C analyzing unknown objects having unknown values of the one or more characteristics of interest, comprising the steps of:

I imaging the unknown objects having unknown values of the one or more characteristics of interest against a background to obtain an original digital image, wherein the original digital image comprises pixels representing the unknown objects, the background and any debris;

II processing the original digital image to identify, separate, and retain the pixels representing the unknown objects from the pixels representing the background and the pixels representing any debris, and to eliminate the background and any debris;

III analyzing the pixels representing each of the unknown objects to generate data representative of one or more image parameters for each of the unknown objects;

IV providing the data to the flash code deployed from the candidate neural network model;

V analyzing the data through the flash code; and

VI receiving the output data from the flash code in a predetermined format, wherein the output data represents the unknown values of the one or more characteristics of interest of the unknown objects.

4. The method according to claim 3, wherein step A(V), further comprises the step of processing the digital image to identify, separate, and retain pixels representing the known objects from pixels representing the background and pixels representing any debris, and to eliminate the background and any debris.

5. The method according to claim 4, further comprising the step of detecting an edge of each of the objects and distinguishing each of the known objects from the background.

6. The method according to claim 5, wherein detecting the edge of each of the objects comprises applying an edge detection algorithm.

7. The method according to claim 4, further comprising the step of eliminating from the original digital image, an outer layer of pixels on the outer circumference of each of the objects and any debris.

8. The method according to claim 7, further comprising the step of processing the digital image comprising pixels representing known objects to remove some debris and to separate each of the known objects comprising the steps of:

i removing some debris from the original digital image of the known objects by applying a first digital sieve, wherein the first digital sieve selects the pixels representing each of the known objects meeting a predetermined threshold for a first set of one or more image parameters of the known objects; and ii in the image from (i), separating each of the known objects that are adjacent by applying an object-splitting algorithm at least once.

9. The method according to claim 8(i), wherein the first digital sieve selects the pixels representing each of the known objects meeting a predetermined threshold for a first set of one or more image parameters, wherein the one or more image parameters are size or shape or both.

10. The method according to claim 9, wherein distinguishing the known objects from the background comprises applying a predetermined threshold to the original digital image to create a binary mask having ON pixels in areas representing each of the known objects and OFF pixels in areas representing the background.

11. The method according to claim 10, wherein the ON pixels display intensities represented by numerical RGB color values.

12. The method according to claim 11, wherein the OFF pixels display intensities represented by RGB values of 000.

13. The method according to claim 12, further comprising the step of applying a Boolean logic command, AND, to combine the original digital image with the binary mask to create a new digital image, wherein the new digital image comprises pixels representing each of the known objects and wherein the pixels representing each of the known objects have a detected edge.

14. The method according to claim 13, further comprising the step of processing the digital image comprising pixels representing known objects to remove remaining debris or object anomalies comprising the step of separating and removing pixels representing remaining debris or object anomalies from the pixels representing each of the known objects by applying a second digital sieve, wherein the second digital sieve selects the pixels representing each of the known objects meeting predetermined thresholds for a second set of one or more image parameters.

15. The method according to claim 14, wherein the second digital sieve selects the pixels representing each of the known objects meeting predetermined thresholds for a second set of one or more image parameters, wherein the one or more image parameters are roundness, shape, perimeter convex, aspect ratio, area, area polygon, dendrites, perimeter ratio and maximum radius.

16. The method according to claim 15, further comprising the step of applying a predetermined threshold to the new digital image, to create a binary mask having ON pixels in areas representing each of the known objects and OFF pixels in areas representing the background.

17. The method according to claim 16, wherein the ON pixels display intensities represented by numerical RGB color values.

18. The method according to claim 17, wherein the OFF pixels display intensities represented by RGB values of 000.

19. The method according to claim 18, further comprising the step of applying a Boolean logic command, AND, to combine the original digital image with the binary mask to create a new digital image, wherein the new digital image comprises pixels representing each of the known objects and wherein the pixels representing each of the known objects have a detected edge.

20. The method according to claim 19, further comprising the step of analyzing pixels representing the known objects to generate data representative of one of more parameters for each of the known objects wherein the one or more image parameters are dimension, shape, texture, and color.

21. The method according to claim 20, wherein the one or more image parameters of dimension and shape are area, aspect, area/box, major axis, minor axis, maximum diameter, minimum diameter, mean diameter, maximum radius, minimum radius, radius ratio, integrated optical density, length, width, perimeter, perimeter convex, perimeter ellipse, perimeter ratio, area polygon, fractal dimension, minimum feret, maximum feret, mean feret, and roundness.

22. The method according to claim 20, wherein the one or more image parameters of texture are margination, heterogeneity, and clumpiness.

23. The method according to claim 20, wherein the one or more image parameters of color are density for red, density for green, density for blue, minimum density, maximum density, standard deviation of density, and mean density.

24. The method according to claim 23, further comprising the step of obtaining one or more image parameters of color for the known objects comprising the step of generating an outline of the pixels representing each of the known objects.

25. The method according to claim 24, further comprising the step of obtaining color spectral information of the pixels representing each of the objects by recording a data set representative of the number of pixels contained in each of the multiplicity of intensity levels contained in each of the RGB color bands that are contained in each of the objects.

26. The method according to claim 25, further comprising the step of executing a command to calculate the number of pixels in a determined set of ranges in each of the RGB color bands to obtain a value.

27. The method according to claim 26, further comprises the step of normalizing the value by dividing each band range pixel count by the total pixel count of each image of each of the objects.

28. The method according to claim 27, which further comprises validating the optimal neural network model comprising the steps of:
  I selecting more than one sample of the known objects having a known value for the one or more characteristics of interest;
  II imaging each sample to obtain an original digital image for each sample, wherein the original digital image comprises pixels representing the known objects, background and any debris;
  III processing the original digital image to identify, separate, and retain the pixels representing the known objects from the pixels representing the background and the pixels representing any debris, and to eliminate the background and any debris;
  IV analyzing the pixels representing each of the known objects to generate data representative of one or more image parameters for each of the known objects;
  V providing the data to the flash code deployed from the candidate neural network model;
  VI analyzing the data through the flash code;
  VII evaluating the output data from the flash code for accuracy and repeatability;
  VIII choosing and deploying the flash code of the optimal neural network model for identifying or quantifying the one or more characteristics of interest of unknown objects having unknown values of the one or more characteristics of interest.

29. The method according to claim 28, which further comprises analyzing unknown objects having unknown values of the one or more characteristics of interest comprising:
  I imaging the unknown objects having unknown values of the one or more characteristics of interest to obtain an original digital image, wherein the original digital image comprises pixels representing the unknown objects, the background and any debris;
  II processing the original digital image to identify, separate, and retain the pixels representing the unknown objects from the pixels representing the background and the pixels representing any debris, and to eliminate the background and any debris;
  III analyzing the pixels representing each of the unknown objects to generate data representative of one or more image parameters for each of the unknown objects;
  IV providing the data to the flash code deployed from the candidate neural network model;
  V analyzing the data through the flash code; and
  VI receiving the output data from the chosen flash code in a predetermined format, wherein the output data represents the unknown values of the one or more characteristics of interest of the unknown objects.

30. The method according to claim 29, wherein step (II), further comprises the step of processing the digital image to identify, separate, and retain pixels representing the unknown objects from pixels representing the background and pixels representing any debris, and to eliminate the background and any debris.

31. The method according to claim 30, further comprising the step of detecting an edge of each of the unknown objects and distinguishing each of the unknown objects from the background.

32. The method according to claim 31, wherein detecting the edge of each of the unknown objects comprises applying an edge detection algorithm.

33. The method according to claim 30, further comprising the step of eliminating from the original digital image, an outer layer of pixels on the outer circumference of each of the unknown objects and any debris.

34. The method according to claim 33, further comprising the step of processing the digital image comprising pixels representing unknown objects to remove some debris and to separate each of the unknown objects comprising the steps of:
  i removing some debris from the original digital image of the unknown objects by applying a first digital sieve, wherein the first digital sieve selects the pixels representing each of the unknown objects meeting a predetermined threshold for a first set of one or more image parameters of the unknown objects; and
  ii from the image in (i), separating each of the unknown objects that are adjacent by applying an object-splitting algorithm at least once.

35. The method according to claim 34(i), wherein the first digital sieve selects the pixels representing each of the unknown objects meeting a predetermined threshold for a first set of one or more image parameters, wherein the one or more image parameters are size or shape or both.

36. The method according to claim 35, wherein distinguishing the unknown objects from the background comprises applying a predetermined threshold to the original digital image to create a binary mask having ON pixels in areas representing each of the unknown objects and OFF pixels in areas representing the background.

37. The method according to claim 36, wherein the ON pixels display intensities represented by numerical RGB color values.

38. The method according to claim 37, wherein the OFF pixels display intensities represented by RGB values of 000.

39. The method according to claim 38, further comprising the step of applying a Boolean logic command, AND, to combine the original digital image with the binary mask to create a new digital image, wherein the new digital image comprises pixels representing each of the unknown objects and wherein the pixels representing each of the unknown objects have a detected edge.

40. The method according to claim 39, further comprising the step of processing the digital image comprising pixels representing unknown objects to remove remaining debris or object anomalies comprising the step of separating and removing pixels representing remaining debris or object anomalies from the pixels representing each of the unknown objects by applying a second digital sieve, wherein the second digital sieve selects the pixels representing each of the unknown objects meeting predetermined thresholds for a second set of one or more image parameters.

41. The method according to claim 40, wherein the second digital sieve selects the pixels representing each of the unknown objects meeting predetermined thresholds for a second set of one or more image parameters, wherein the one or more image parameters are roundness, shape, perimeter convex, aspect ratio, area, area polygon, dendrites, perimeter ratio and maximum radius.

42. The method according to claim 41, further comprising the step of applying a predetermined threshold to the new digital image, to create a binary mask having ON pixels in areas representing each of the known objects and OFF pixels in areas representing the background.

43. The method according to claim 42, wherein the ON pixels display intensities represented by numerical RGB color values.

44. The method according to claim 43, wherein the OFF pixels display intensities represented by RGB values of 000.

45. The method according to claim 44, further comprising the step of applying a Boolean logic command, AND, to combine the original digital image with the binary mask to create a new digital image, wherein the new digital image comprises pixels representing each of the unknown objects and wherein the pixels representing each of the unknown objects have a detected edge.

46. The method according to claim 45, further comprising the step of analyzing pixels representing the unknown objects to generate data representative of one of more parameters for each of the unknown objects wherein the one or more image parameters are dimension, shape, texture, and color.

47. The method according to claim 46, wherein the one or more image parameters of dimension and shape are area, aspect, area/box, major axis, minor axis, maximum diameter, minimum diameter, mean diameter, maximum radius, minimum radius, radius ratio, integrated optical density, length, width, perimeter, perimeter convex, perimeter ellipse, perimeter ratio, area polygon, fractal dimension, minimum feret, maximum feret, mean feret, and roundness.

48. The method according to claim 46, wherein the one or more image parameters of texture are margination, heterogeneity, and clumpiness.

49. The method according to claim 46, wherein the one or more image parameters of color are density for red, density for green, density for blue, minimum density, maximum density, standard deviation of density, and mean density.

50. The method according to claim 49, further comprising the step of obtaining one or more image parameters of color for the unknown objects comprising the step of generating an outline of the pixels representing each of the unknown objects.

51. The method according to claim 50, further comprising the step of obtaining color spectral information of the pixels representing each of the unknown objects by recording a data set representative of the number of pixels contained in each of the multiplicity of intensity levels contained in each of the RGB color bands that are contained in each of the unknown objects.

52. The method according to claim 51, further comprising the step of executing a command to calculate the number of pixels in a determined set of ranges in each of the RGB color bands to obtain a value.

53. The method according to claim 52, further comprising the step of normalizing the value by dividing each band range pixel count by the total pixel count of each image of each of the objects.

54. The method according to claim 53, further comprising the step of providing the data to the flash code deployed from the candidate neural network model.

55. The method according to claim 54, further comprising the step of analyzing the data through the flash code.

56. The method according to claim 55, further comprising the step of receiving the output data from the flash code in a predetermined format, wherein the output data represents the unknown values of the one or more characteristics of interest of the unknown objects.

57. The method according to claim 1, wherein the object is a plant or plant part, food article, biological matter, or industrial article.

58. The method according to claim 57, wherein the one or more characteristics of interest is selected from the group consisting of a class, a variety, a disease, an environmental condition, or a handling condition.

59. The method according to claim 57, wherein the plant or plant part is selected from the group consisting of a leaf, stem, root, plant organ and seed.

60. The method according to claim 59, wherein the plant or plant part is selected from the group consisting of wheat, rice, corn, soybeans, canola, barley, sorghum, millet, rye, oats, flax, buckwheat, alfalfa, mustard, clover, sunflower, field beans, field peas, forages, coffee, lentils, peanuts, beets, lettuce, and hemp seeds.

61. The method according to claim 57, wherein the food article is selected from the group consisting of produce, apples, potatoes, sugar cane, tea, hemp seeds, cocoa beans, nuts, and sugar beets.

62. The method according to claim 57, wherein the biological matter is selected from the group consisting of insects, microorganisms and cells.

63. The method according to claim 57, wherein the industrial article is selected from the group consisting of pharmaceuticals, pills, spray droplets, test plates, Petri dishes, bio-tech arrays, water, paper products, plastic pellets, paint, dry powders, wet products, textiles, raw food samples, processed food samples, package goods, parts, and general granular samples.

64. The method according to claim 60, wherein the object is a seed.

65. The method according to claim 64, wherein the object is a wheat seed.

66. The method according to claim 65, wherein the disease is selected from the group consisting of fusarium head blight, pink smudge, and blackpoint.

67. The method according to claim 66, wherein the disease is fusarium head blight.

68. The method according to claim 67, wherein the environmental condition is selected from the group consisting of frost damage, green seeds, and sprouting seeds.

69. The method according to claim 68, wherein the handling condition is selected from the group consisting of cracked, broken, bin burnt, and degermed seeds.

70. The method according to claim 3, wherein the object is a plant or plant part, food article, biological matter, or industrial article.

71. The method according to claim 56, wherein the object is a plant or plant part, food article, biological matter, or industrial article.

* * * * *